US010534068B2

(12) United States Patent
Jaeger

(10) Patent No.: US 10,534,068 B2
(45) Date of Patent: Jan. 14, 2020

(54) LOCALIZATION SYSTEM, VEHICLE CONTROL SYSTEM, AND METHODS THEREOF

(71) Applicant: Intel Corporation, Santa Clara, CA (US)

(72) Inventor: Bastian Jaeger, Munich (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/233,232

(22) Filed: Dec. 27, 2018

(65) Prior Publication Data

US 2019/0187241 A1     Jun. 20, 2019

(51) Int. Cl.
*G01S 5/02*   (2010.01)
*G01S 5/14*   (2006.01)
*G01S 5/00*   (2006.01)

(52) U.S. Cl.
CPC .............. *G01S 5/14* (2013.01); *G01S 5/0063* (2013.01); *G01S 5/0236* (2013.01); *G01S 5/0284* (2013.01)

(58) Field of Classification Search
CPC ........ B64C 2201/024; B64C 2201/027; B64C 2201/128; B64C 2201/143; B64C 2201/146; B64C 39/024; B64D 47/02; G05D 1/0027; G05D 1/0808; G05D 1/102; G05D 1/104; G08G 5/0021; G08G 5/0069; G08G 5/04; G08G 5/045; G08G 5/0008; G08G 5/0013; G08G 5/0034; G08G 5/0039; G01S 5/14; G01S 5/0063; G01S 5/0236; G01S 5/0284; G01S 13/34; G01S 13/42; G01S 13/66; G01S 13/74; G01S 13/76; G01S 13/82; G01S 13/878; G01S 13/885;
(Continued)

(56) References Cited

U.S. PATENT DOCUMENTS 9,104,201 B1* 8/2015 Pillai ................. B64C 39/024
2008/0243372 A1* 10/2008 Bodin ................ G05D 1/0027
                                                      701/23
(Continued)

OTHER PUBLICATIONS

I. Newsroom, "Introducing Intel Shooting Star Mini—Star of the Indoor Light Show," Intel, 2018. [Online]. Available: https://www.youtube.com/watch?v=6nyvUWrpZGQ.

*Primary Examiner* — Nathan S Taylor
(74) *Attorney, Agent, or Firm* — Viering, Jentschura & Partner mbB

(57) ABSTRACT

According to various aspects, a vehicle localization system is provided, including: a plurality of localization devices configured to receive vehicle position information representing a position of one or more vehicles located in a vicinity of the plurality of localization devices, the plurality of localization devices includes a first set of localization devices and a second set of localization devices, wherein the first set of localization devices is configured to receive additional position information representing a position of one or more localization devices of the second set of localization devices; and one or more processors configured to receive reference position information representing a positional relationship of the localization devices of the first set of localization devices relative to one another, determine a current position of each of the one or more vehicles based on the vehicle position information, the reference position information, and the additional position information.

18 Claims, 18 Drawing Sheets

(58) Field of Classification Search
CPC ............... G01S 13/89; G01S 2007/356; G01S 2007/358; G01S 5/021; G01S 5/0247; G01S 5/0294; G01S 7/003; G01S 7/352; H04W 4/029
USPC ........................................................... 701/3
See application file for complete search history.

(56) References Cited

U.S. PATENT DOCUMENTS

| | | | | |
|---|---|---|---|---|
| 2010/0268409 | A1* | 10/2010 | Vian | G05D 1/104 |
| | | | | 701/24 |
| 2012/0271461 | A1* | 10/2012 | Spata | G01W 1/00 |
| | | | | 700/276 |
| 2014/0139366 | A1* | 5/2014 | Moses | G01S 13/9303 |
| | | | | 342/27 |
| 2014/0249693 | A1* | 9/2014 | Stark | B64C 39/024 |
| | | | | 701/2 |
| 2015/0237481 | A1* | 8/2015 | Ben-Moshe | G01S 1/70 |
| | | | | 455/456.1 |
| 2015/0338855 | A1* | 11/2015 | Stark | B64C 39/024 |
| | | | | 701/3 |
| 2016/0125746 | A1* | 5/2016 | Kunzi | G05D 1/0088 |
| | | | | 701/11 |
| 2016/0207637 | A1* | 7/2016 | Campillo | B64C 39/024 |
| 2016/0363648 | A1* | 12/2016 | Mindell | H04W 4/029 |
| 2017/0045613 | A1* | 2/2017 | Wang | G01S 13/9303 |
| 2017/0195038 | A1* | 7/2017 | Sham | H04B 7/18504 |
| 2018/0174472 | A1* | 6/2018 | Rodenbeck | B64C 39/024 |
| 2018/0253093 | A1* | 9/2018 | Augugliaro | G05D 1/0027 |
| 2018/0275654 | A1* | 9/2018 | Merz | G01S 13/9303 |

* cited by examiner

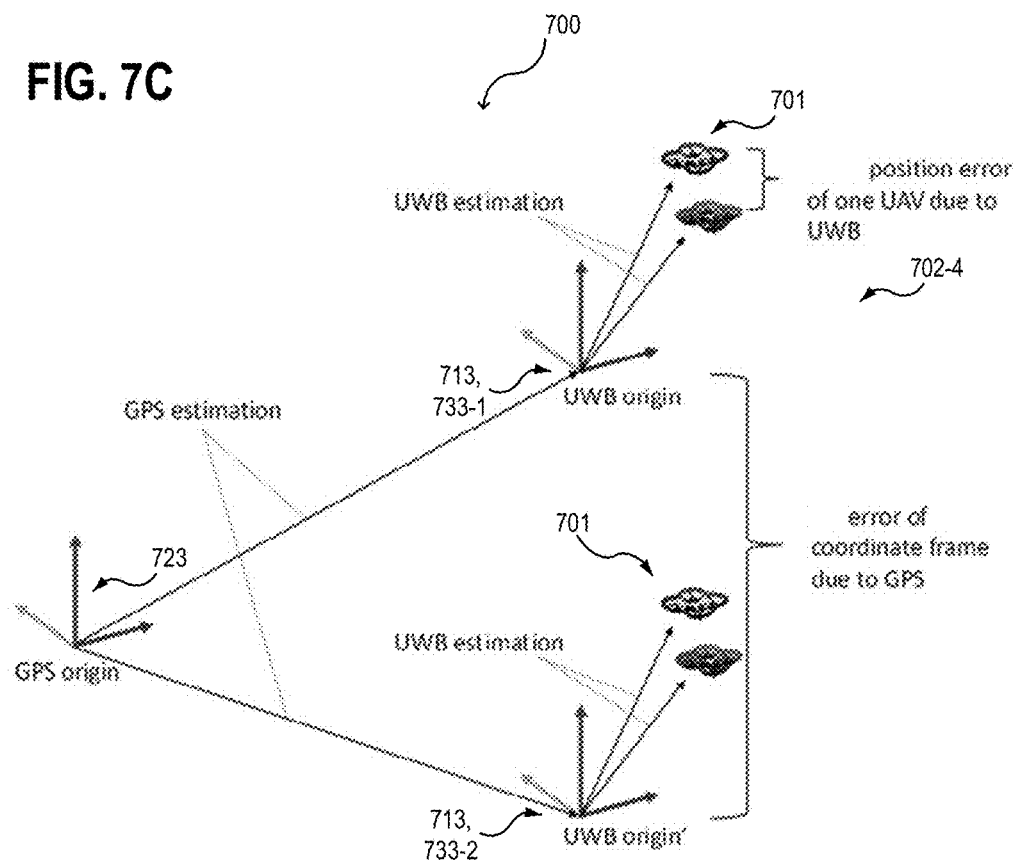

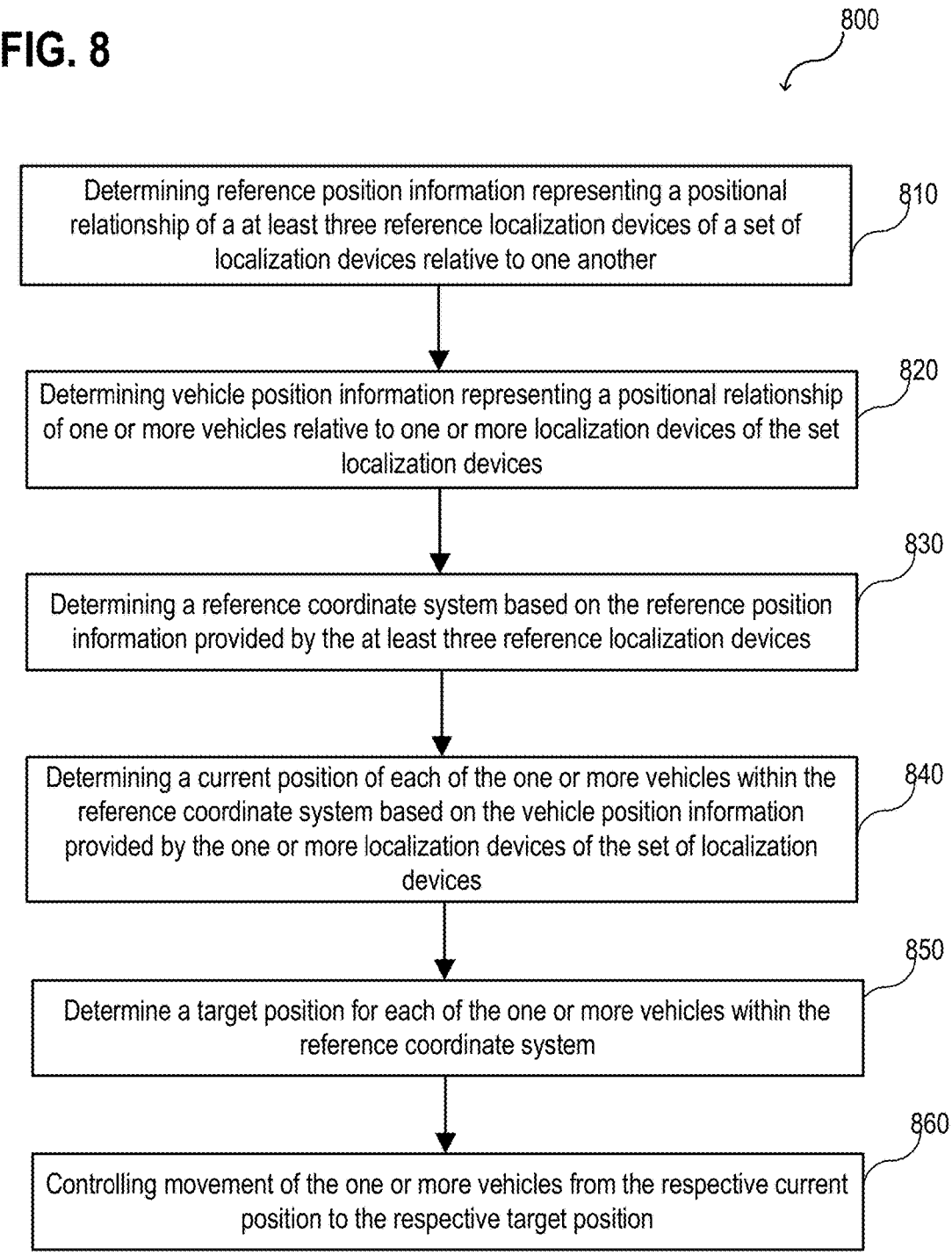

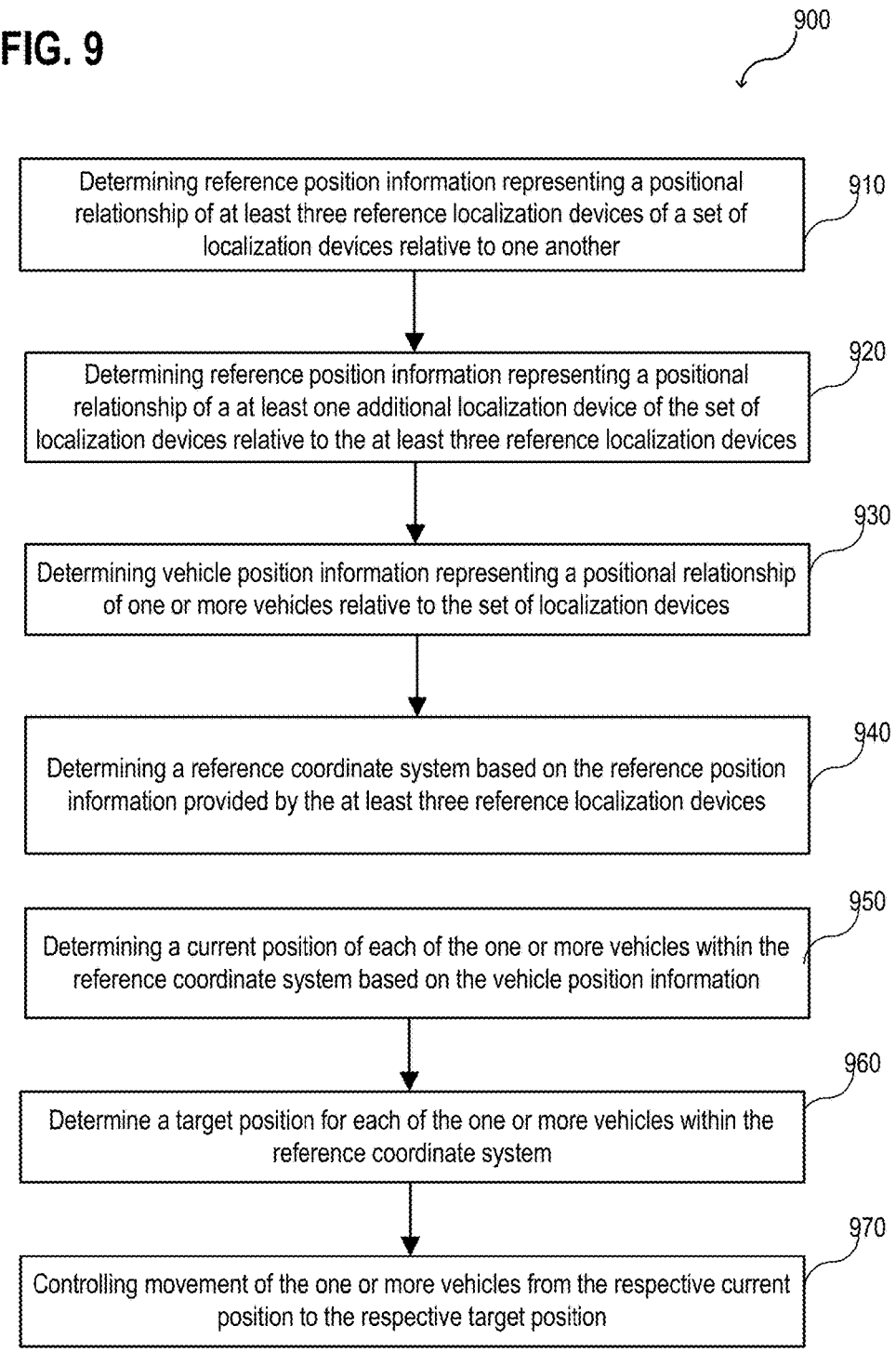

LOCALIZATION SYSTEM, VEHICLE CONTROL SYSTEM, AND METHODS THEREOF

TECHNICAL FIELD

Various aspects relate generally to a localization system, a vehicle control system, and methods thereof, e.g. a method for localizing one or more vehicles (e.g. one or more unmanned aerial vehicles), e.g. a method for controlling one or more vehicles (e.g. one or more unmanned aerial vehicles), e.g. a method for localizing and controlling one or more vehicles (e.g. one or more unmanned aerial vehicles).

BACKGROUND

An unmanned aerial vehicle (UAV) may have one or more processors to control flight of the unmanned aerial vehicle along a predefined flight path. The one or more processors to control the predefined flight of the unmanned aerial vehicle may be also referred to as a flight controller or may be part of a flight controller. The predefined flight path may be provided and/or modified, for example, by manual remote control, waypoint control, target tracking, etc. In general, a movement of an unmanned aerial vehicle may be controlled based on the knowledge of the current position thereof, and, therefore, a localization of the unmanned aerial vehicle may be desirable. There may be various technologies available for indoor and outdoor localization. In general, a Global Position System (GPS) and corresponding maps may be used for outdoor localization. However, since GPS location signals may not able to penetrate buildings or other solid structures in a sufficient manner, a GPS based localization may not be useful for indoor localization. Various localization systems may be for indoor localization, wherein these localization systems may be based on wireless signal transmission, such as infrared, WIFI, Bluetooth, ZigBee, ultrasound, radio frequency identification (RFID), ultra-wideband (UWB), as examples.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 7A to 7C show a localization system and a vehicle control system in a schematic view, according to various aspects;

FIG. 8 shows a method for controlling one or more vehicles in a schematic flow diagram, according to various aspects;

FIG. 9 shows a method for controlling one or more vehicles in a schematic flow diagram, according to various aspects;

DESCRIPTION

Figure 1:
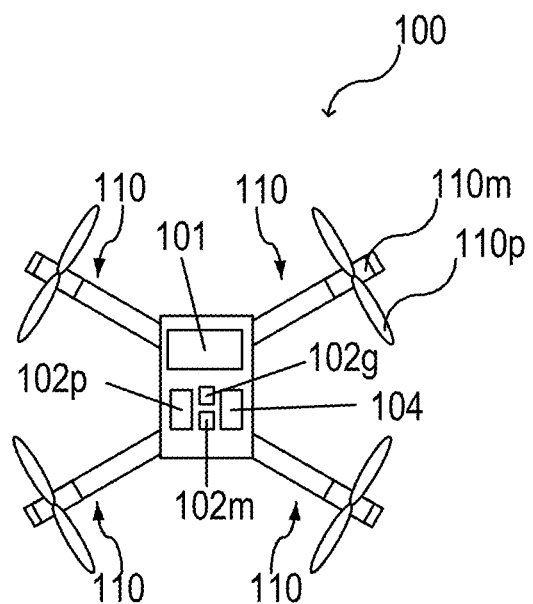
FIG. 1 shows an unmanned aerial vehicle in a schematic view, according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and in the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. Any type of information, as described herein, may be handled for example via one or more processors in a suitable way, e.g. as data.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a control system, a localization system, a computing system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "position" used with regard to a "position of a vehicle", "position of an object", "position of a device", and the like, may be used herein to mean a point or region in a two- or three-dimensional space. It is understood that suitable coordinate systems with respective reference points are used to describe positions, distances, angles, vectors, movements, and the like. The term "position information" used with regard to a "vehicle position information", "object position information", "reference position information", "additional position information", and the like, may be used herein to mean any type information that can be used to determine (e.g. calculate, estimate, predict) an absolute position, a relative, position, a position difference, a direction, and the like, of one or more vehicles, objects, devices, and the like. According to various aspects, an absolute position (e.g. of a vehicle, an object, a localization device, as examples) may be determined (e.g. in an outdoor area) with reference to a geographic coordinate system, e.g. in global positioning system (GPS) coordinates. However, for a flying object, a height (e.g. a height over ground) may be considered as well. According to various aspects, an absolute position (e.g. of a vehicle, an object, a localization device, as examples) may be determined (e.g. in an outdoor area) with reference to a previously established reference coordinate system, e.g. in any suitable coordinates. The reference coordinate system may be generated by one or more (e.g. three or four) beacons. Via distance measurements or other measurements to determine a positional relationship between one or more objects to be localized and the one or more beacons, an absolute position of the one or more objects may be determined in the reference coordinate system. According to various aspects, the reference coordinate system may change its position in the geographic coordinate system, e.g. the one or more beacons may be mobile. However, the characteristics of the reference coordinate system may remain constant even though the reference coordinate system may move.

The term "path" used with regard to a "flight path", "movement path", and the like, may be understood as a trajectory in a two- or three-dimensional space. Movement of a plurality of vehicles may be controlled based on a movement plan. With reference to one or more unmanned aerial vehicles, a movement plan is referred to as a flight plan. The movement plan may include one or more predefined movement paths along which the one or more vehicles shall travel. A predefined movement path (or a predefined trajectory) may include a series (e.g., a time-resolved series) of positions along which the vehicle has traveled, is traveling, and/or is intended to travel. A current position of the vehicle and at least one target position may define a remaining movement path.

The term "map" used with regard to a two- or three-dimensional map may include any suitable way of describing positions of objects in the two- or three-dimensional space. According to various aspects, a map may be used to store position information and/or the ambient condition information in a suitable form of data that allows controlling one or more operations of the unmanned aerial vehicle based on the map. However, other suitable implementations may be used to allow control of the unmanned aerial vehicle based on at least the movement data.

An unmanned aerial vehicle (UAV) is an aircraft that has the capability of autonomous flight. In autonomous flight, a human pilot is not aboard and in control of the unmanned aerial vehicle. The unmanned aerial vehicle may also be denoted as an unstaffed, uninhabited or unpiloted aerial vehicle, -aircraft or -aircraft system or drone.

The unmanned aerial vehicle described herein can be in the shape of an airplane (e.g. a fixed wing airplane) or a copter (e.g. multi rotor copter), i.e. a rotorcraft unmanned aerial vehicle, e.g. a quad-rotor unmanned aerial vehicle, a hex-rotor unmanned aerial vehicle, an octo-rotor unmanned aerial vehicle. The unmanned aerial vehicle described herein may include a plurality of rotors (e.g., three, four, five, six, seven, eight, or more than eight rotors), also referred to as propellers. Each of the propellers has one or more propeller blades. In some aspects, the propellers may be fixed pitch propellers.

The unmanned aerial vehicle may be configured to operate with various degrees of autonomy: under remote control by a human operator, or fully or intermittently autonomously, by onboard computers. The unmanned aerial vehicle may be configured to lift-off (also referred to as take-off) and land autonomously in a lift-off and/or a landing operation mode. Alternatively, the unmanned aerial vehicle may be controlled manually by a radio control (RC) at lift-off and/or landing. The unmanned aerial vehicle may be configured to fly autonomously based on a flight path. The flight path may be a predefined flight path, for example, from a starting point or a current position of the unmanned aerial vehicle to a target position, or, the flight path may be variable, e.g., following a target that defines a target position. In some aspects, the unmanned aerial vehicle may switch into a GPS-guided autonomous mode at a safe altitude or safe distance. The unmanned aerial vehicle may have one or more fail-safe operation modes, e.g., returning to the starting point, landing immediately, etc. In some aspects, the unmanned aerial vehicle may be controlled manually, e.g., by a remote control during flight, e.g. temporarily.

In the following, an unmanned aerial vehicle is described in more detail. According to various aspects, an unmanned aerial vehicle may be used as a carrier (also referred to as carrier drone) for one or more localization devices, e.g. for a GPS localization device and a UWB localization device. According to various aspects, an unmanned aerial vehicle may include only one localization device, e.g. a UWB localization device. An unmanned aerial vehicle including only one localization device, e.g. one UWB localization device, may be smaller and/or lighter than an unmanned aerial vehicle including more than on localization device, e.g. a GPS localization device and a UWB localization device. The unmanned aerial vehicle including only one localization device, e.g. one UWB localization device, may be used to perform part of a light show. The carrier drones may assist a localization of the unmanned aerial vehicles performing the light show.

FIG. 1 illustrates an unmanned aerial vehicle 100 in a schematic view, according to various aspects. The unmanned aerial vehicle 100 may include a plurality of (e.g., three or more than three, e.g., four, six, eight, etc.) vehicle drive arrangements 110. Each of the vehicle drive arrangements 110 may include at least one drive motor 110m and at least one propeller 110p coupled to the at least one drive motor 110m. According to various aspects, the one or more drive motors 110m of the unmanned aerial vehicle 100 may be electric drive motors. Therefore, each of the vehicle drive arrangements 110 may be also referred to as electric drive or electric vehicle drive arrangement.

Further, the unmanned aerial vehicle 100 may include one or more processors 102p configured to control flight or any other operation of the unmanned aerial vehicle 100. The one or more processors 102p may be part of a flight controller or may implement a flight controller. The one or more processors 102p may be configured, for example, to provide a flight path based at least on a current position of the unmanned aerial vehicle 100 and a target positon for the unmanned aerial vehicle 100. In some aspects, the one or more processors 102p may control the unmanned aerial vehicle 100 based on a map. In some aspects, the one or more processors 102p may control the unmanned aerial vehicle 100 based on received control signals. As an example, a flight control system may transmit control signals to the unmanned aerial vehicle 100 to cause a movement of the unmanned aerial vehicle 100 along a predefined flight path. In some aspects, the one or more processors 102p may directly control the drive motors 110m of the unmanned aerial vehicle 100, so that in this case no additional motor controller may be used. Alternatively, the one or more processors 102p may control the drive motors 110m of the unmanned aerial vehicle 100 via one or more additional motor controllers. The motor controllers may control a drive power that may be supplied to the respective motor. The one or more processors 102p may include or may implement any type of controller suitable for controlling the desired functions of the unmanned aerial vehicle 100. The one or more processors 102p may be implemented by any kind of one or more logic circuits.

According to various aspects, the unmanned aerial vehicle 100 may include one or more memories 102m. The one or more memories 102m may be implemented by any kind of one or more electronic storing entities, e.g. one or more volatile memories and/or one or more non-volatile memories. The one or more memories 102m may be used, e.g., in interaction with the one or more processors 102p, to implement various desired functions, according to various aspects.

Further, the unmanned aerial vehicle 100 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the unmanned aerial vehicle 100 may include a localization device 101. The localization device 101 may be configured to provide (e.g. receive, send, generate, as examples) position information representing a positional relationship of the localization device 101 relative to one or more other localization devices in a vicinity of the unmanned aerial vehicle 100. In some aspects, the localization device 101 may include one or more wireless access points configured to determine a direction and/or distance to one or more other localization devices in a vicinity of the unmanned aerial vehicle 100. In some aspects, the localization device 101 may include a wireless tracker configured to allow a determination of a positional information (e.g. a direction, an absolute distance, a relative distance, etc.) of the localization device 101 relative to one or more other localization devices in a vicinity of the unmanned aerial vehicle 100. The localization device 101 may include, for example, any suitable transmitter, receiver, transceiver, etc., that allows for a detection of an object and information representing the position of the object. The transmitter, receiver, transceiver, etc. may operate based on wireless signal transmission, e.g. based in ultra-wideband transmission.

In some aspects, the unmanned aerial vehicle 100 may further include a position detection device 102g. The position detection device 102g may be based, for example, on global positioning system (GPS) or any other available positioning system. The position detection device 102g may be used, for example, to provide position and/or movement data of the unmanned aerial vehicle 100 itself (including a position in GPS coordinates, e.g., a flight direction, a velocity, an acceleration, etc.). However, other sensors (e.g., image sensors, a magnetic senor, etc.) may be used to provide position and/or movement data of the unmanned aerial vehicle 100. In some aspects, the position detection device 102g may be a GPS tracker.

According to various aspects, the one or more processors 102p may include (or may be communicatively coupled with) at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The unmanned aerial vehicle 100 may further include (or may be communicatively coupled with) an inertial measurement unit (IMU) and/or a compass unit. The inertial measurement unit may allow, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a velocity (also referred to as flight velocity), a direction (also referred to as flight direction), etc., may be implemented in the one or more processors 102p and/or in additional components coupled to the one or more processors 102p. To receive, for example, position information and/or movement data about one or more objects in a vicinity of the unmanned aerial vehicle 100, information of a depth imaging system and image processing may be used. Further, to store the respective information in the (e.g., internal) map of the unmanned aerial vehicle 100, as described herein, at least one computing resource may be used.

The unmanned aerial vehicle 100 may be referred to herein as drone. However, a drone may include other unmanned vehicles, e.g. unmanned ground vehicles, water vehicles, etc. In a similar way, any vehicle having one or more autonomous functions based on position information of the vehicle (e.g. one or more autonomous functions associated with a control of a movement of the vehicle) may include the functionalities described herein.

Various aspects are related to a localization system that is configured to allow a high precision localization of comparatively small objects. Such a small object may include a vehicle having a small form factor. The vehicle may be a drone or any other vehicle having one or more autonomous functions to control movement of the vehicle based on a localization thereof. As an example, a drone may include frame and/or a body surrounding one or more electronic components (e.g. one or more processors, one or more sensors, one or more electric drive components, one or more power supply components, as examples). A small drone, as referred to herein, may include a frame and/or body with a maximal dimension of less than 20 cm, e.g. less than 10 cm. Further, a small drone, as referred to herein, may have a maximal weight of less than 250 g, e.g. less than 100 g.

Further, various aspects are related to a vehicle control system that may be used to control movement of a plurality of vehicles (e.g. of more than 20, more than 50, or more than 100 vehicles). The plurality of vehicles may be controlled in accordance with a predefined movement plan, wherein a precise localization of the vehicles may be beneficial so that the actual movement path of the vehicle deviates as less as possible from the predefined movement path. A precise localization of a plurality of small drones may be beneficial to control a movement of the plurality of drones simultaneously (illustratively as a swarm) and to perform a predefined choreography as precise as possible, e.g. to perform a light show or to display a predefined image, as examples.

In general, various autonomous operation modes of a drone may require a knowledge of the position of the drone. A position of a drone may be determined based on GPS (Global Positioning System) information, e.g. RTK (Real Time Kinematic) GPS information. However, for some reasons a drone may not be capable of carrying electronic components that allows for a precise localization of the drone based on GPS (e.g. RTK-GPS). As an example, the drone may be too small and/or too light to carry a precise GPS localization device, or the drone may be too expensive if a precise GPS localization device would be implemented therein.

At least for some applications, an unmanned aerial vehicle may have a demand on being as lightweight as possible, e.g. for use cases as, for example, indoor lightshows or a warehouse inspection. An addition, a precise localization may be a challenging aspect for operating drones, e.g. unmanned aerial vehicles. As an example, a precise localization of a drone combined with a low weight of the drone may be desirable for performing indoor light shows.

As an example, in the case that drones are operated in a swarm, e.g. with an increasing number of drones per volume (e.g. with more than one drone per cubic meter, e.g. more than five drones per cubic meter, or more than ten drones per cubic meter, as examples) a more precise localization may be required compared to an operation of, for example, a single drone, e.g. a drone for delivering goods and the like. A GPS localization with a precision of about ±1 m may be acceptable for flying a drone in 100 m altitude, but this precision may be in some cases unacceptable, e.g. for an unmanned aerial vehicle doing an indoor light show. However, a precision tracking/localization of an unmanned aerial vehicle or any other drone may not be limited to an indoor usage during a light show. A general problem may be a high precision tracking/localization for a small sized unmanned aerial vehicle in an outdoor area.

In indoor areas, a plurality of static sensors may be used to track one or more moving objects, e.g. based on UWB tracking. However, it may be difficult to setup the static sensors, e.g. to mount a sensor at a ceiling and/or a wall prior to an operation of the localization (e.g. UWB) system. In some case, it may be insufficient with respect to the precision and/or unambiguity of the localization to position the UWB sensors only on the ground. Thus, in conventional indoor localization systems, a preparation phase may be usually necessary to mount the sensors.

Various aspects described herein may be related to a localization system that is configured to enable an unmanned aerial vehicle or a fleet of unmanned aerial vehicles to localize themselves or to be localized in outdoor areas with a high precision (e.g. with a localization accuracy of less than 50 cm, e.g. less than 30 cm, e.g. less than 10 cm). According to various aspects, the unmanned aerial vehicle to be localized may be equipped with a lightweight UWB tracker and/or any other suitable localization device. Instead of mounting sensors to walls and/or ceilings, one or more reference unmanned aerial vehicles may be used to serve as UWB localization pillars (also referred to as beacons or access points) for the localization of one or more other unmanned aerial vehicles. As an example, a miniature light show, a drone show, and/or any other task demanding high localization precision in the sky, may be realized based on a localization system and/or the vehicle control system described herein.

In some aspects, at least a subset of the localization devices that are used for a localization of one or more unmanned aerial vehicles may be positioned automatically during a setup so that a preparation phase for the proposed system may be minimal. According to various aspects, a set of mobile localization devices may be used as reference system so that any executed task based on the reference system can be moved or executed during a movement of the set of mobile localization devices. As an example, a light show may be planned based on a predefined flight plan, wherein the predefined flight plan is based on the reference system, and wherein the reference system may be moved to a desired position by moving the corresponding unmanned aerial vehicles defining the reference system.

According to various aspects, a localization system is described herein that may be used to localize one or more objects in an operating area of the localization system. The dimensions of the operating area may be dependent on characteristics (e.g. the frequency range, the transmission power, the antenna design, etc.) of a wireless localization setup including a plurality of localization devices that may be used for the localization.

Figure 2:
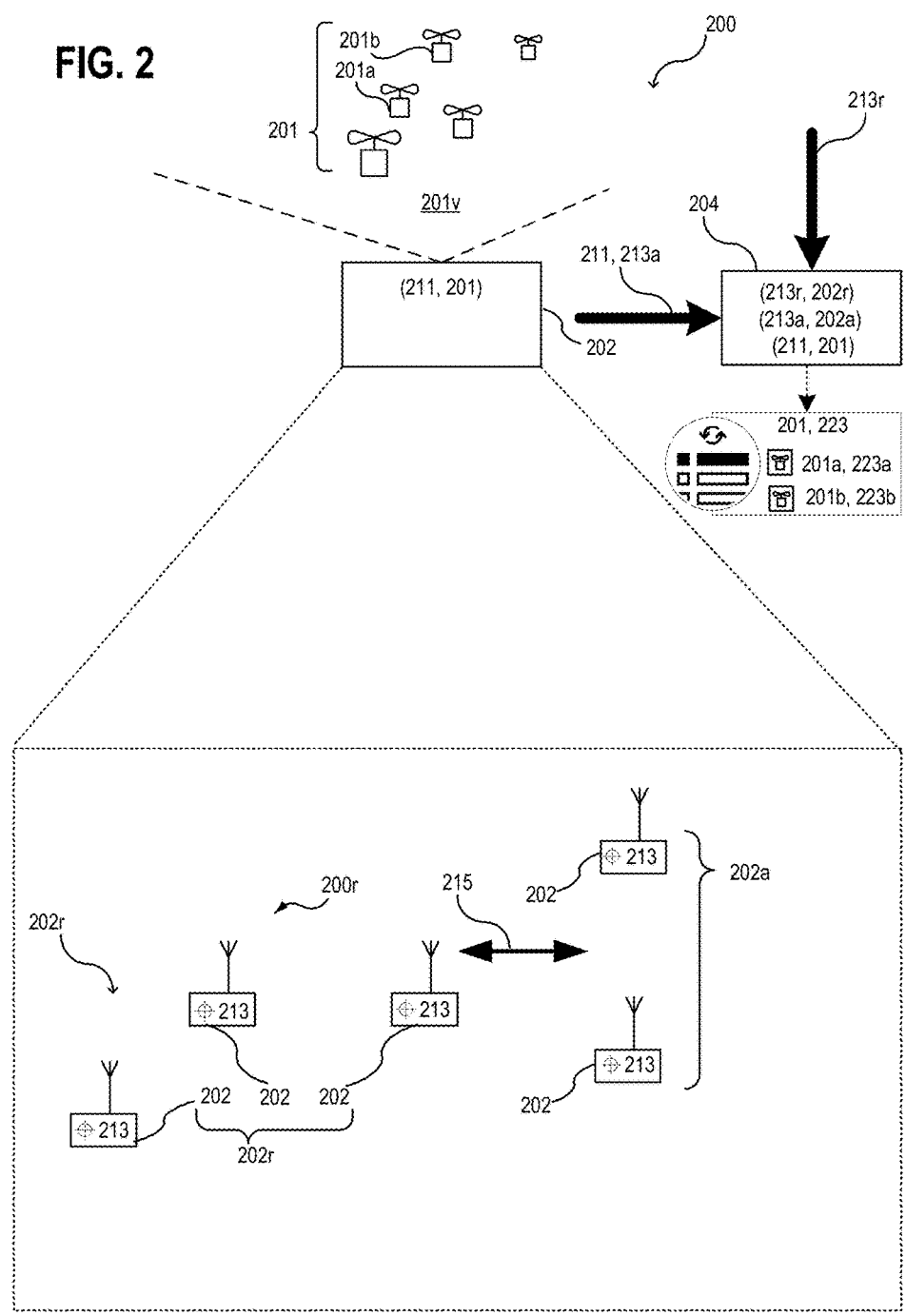
FIG. 2 shows a localization system in a schematic view, according to various aspects.

FIG. 2 shows a localization system 200 in a schematic view, according to various aspects. The localization system 200 may include, for example, a plurality of localization devices 202 configured to receive position information 211 representing a respective position of one or more objects 201 within a vicinity 201v of the plurality of localization devices 202. In some aspects, the position information 211 may be assigned to the respective object 201 and may be, for example, stored as any suitable type of data in one or more memories accordingly.

According to various aspects, the plurality of localization devices 202 may include a first set 202r of localization devices 202 and a second set 202a of localization devices 202. The localization devices of the first set 202r of localization devices 202 may serve as reference for a localization of one or more other (e.g. additional) localization devices 202 and/or for a localization of the one or more objects 201. According to various aspects, the (e.g. reference) localization devices of the first set 202r of localization devices 202 may be used for a localization of one or more (e.g. additional) localization devices of the second set 202a of localization devices 202. Illustratively, the localization devices of the first set 202r may provide a reference system 200r (also referred to as basic system) and the localization devices of the second set 202a may be integrated additionally into the localization system 200 via the reference system 200r. As an example, the reference system 200r may include at least three localization devices 202 (also referred to as reference localization devices or basic localization devices). In connection with the reference system 200r, the one or more additional localization devices 202 may be used to, for example, enhance a localization precession of the reference system 200r.

According to various aspects, the localization system 200 may include one or more processors 204 (e.g. as a part of a control system). The one or more processors 204 may be configured to receive or determine reference position information 213r representing a respective position 213 of each localization device of the first set 202r of localization devices 202. According to various aspects, the reference position information 213r may represent a positional relationship of the localization devices of the first set 202r of localization devices 202 relative to one another. In some aspects, the one or more processors 204 may be further configured to determine additional position information 213a representing a respective position 213 of each localization device of the second set 202a of localization devices 202. The additional position information 213a may represent a positional relationship of each localization device of the second set 202a of localization devices 202 relative to the localization devices of the first set 202r of localization devices 202. In some aspects, the localization devices of the first set 202r of localization devices 202 may be used to establish a reference coordinate system and the additional position information 213a may represent a positional relationship of each localization device of the second set 202a of localization devices 202 relative to the reference coordinate system.

In some aspects, the additional position information 213a may be determined via the first set 202r of localization devices 202. As an example, the first set 202r of localization devices 202 may be used to localize 215 each localization device 202 of the second set 202a. In some aspects, the one or more processors 204 may be further configured to determine a reference coordinate system based on the received reference position information 213r (see, for example, FIG. 3).

According to various aspects, the one or more processors 204 may be further configured to determine a current position 223 of each of the one or more objects 201 based on the position information 211 received by the plurality of localization devices 202 and based on the reference position information 213r and additional position information 213a. As an example, a first position 223a may be determined corresponding to a first object 201a of the one or more objects 201 and a second position 223b may be determined corresponding to a second object 201b of the one or more objects 201.

Figure 3:
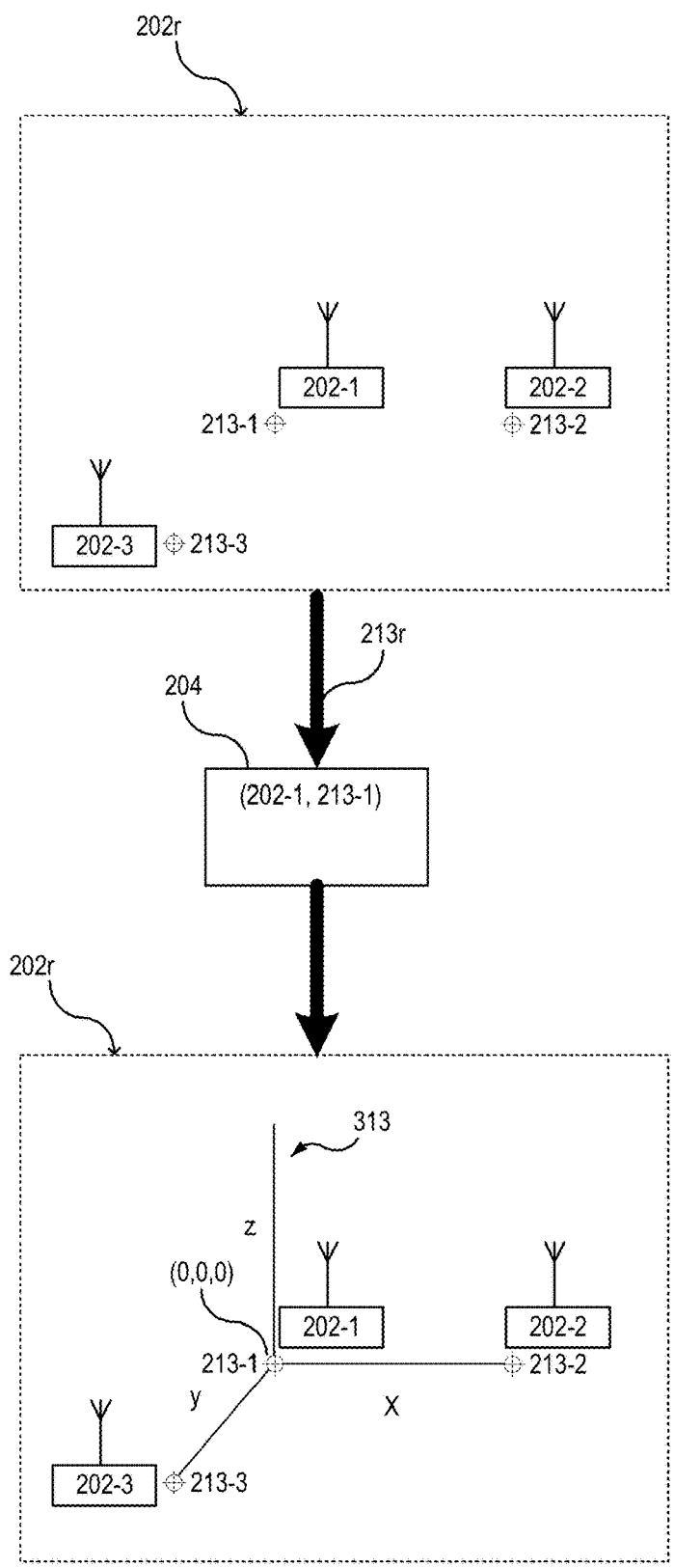
FIG. 3 shows various aspects of a localization system in a schematic view.

FIG. 3 shows various functions of the localization system 200 in a schematic view, according to various aspects. The one or more processors 204 of the localization system 200 may be configured to determine (e.g. calculate, estimate, predict, and the like) a reference coordinate system 313 based on the received reference position information 213r.

As an example, the first set 202r of localization devices 202 may include a first localization device 202-1 at a first position 213-1, a second localization device 202-2 at a second position 213-2, and a third localization device 202-2 at a third position 213-3. The first position 213-1 may define an origin (0,0,0) of the reference coordinate system 313, the first position 213-1 and the second position 213-2 may define a first axis X of the reference coordinate system 313, the first position 213-1 and the third position 213-3 may define a second axis Y of the reference coordinate system 313, and the first axis X and the second axis Y may define a third axis Z of the reference coordinate system 313. According to various aspects, the three positions 213-1, 213-2, 213-3 may define a reference plane (also referred to as basic plane). The reference plane may define the xy-plane of the reference coordinate system 313; in other words, both the first axis X and the second axis Y of the reference coordinate system 313 lie within the reference plane.

According to various aspects, the reference coordinate system 313 may be used to determine the positions 213 of each localization device 202 of the second set 202a. As an example, the respective positions of each localization device of the plurality of localization devices 202 may be determined within the reference coordinate system 313. Illustratively, in the case that the position of each of the plurality of localization devices 202 is known (e.g. within the reference coordinate system 313), the plurality of localization devices 202 including the first set 202r of localization devices 202 and the second set 202a of localization devices 202 may be used to determine the position 213 of each of the one or more objects 201. In some aspects, the position 213 of each of the one or more objects 201 may be determined by distance measurements and basic mathematical calculations.

According to various aspects, the plurality of localization devices 202 may be operated via the one or more processors and/or via one or more dedicated processors of the localization devices. In the case that one or more of the localization devices 202 are mounted to a vehicle (e.g. a ground vehicle, an unmanned aerial vehicle, as examples), one or more processors of the vehicle may partially or completely operate the respective localization device 202.

According to various aspects, the localization devices 202 may be configured to communicate with one another based on wireless signal transmission. In some aspects, one or more of the localization devices 202 may be configured to localize themselves and/or additional localization devices. Further, when the current positions of the plurality of localization devices 202 is known, the plurality of localization devices or at least a subset thereof may be used to localize one or more objects 201.

According to various aspects, a localization via the plurality of localization devices 202 may include at least one of the following aspects: determining an absolute distance between two localization devices 202, determining a distance difference of a first distance between a first localization device 202 and a second localization device 202 and a second distance between the first localization device and a second localization device, determining an angle between a first direction from a first localization device 202 to a second localization device 202 and a second direction from the first localization device 202 to a third localization device 202.

According to various aspects, a localization via the plurality of localization devices 202 may include one or more a time of flight (ToF) determinations, one or more time difference of arrival (TDOA) determinations, one or more direction of arrival (DOA) determinations, one or more angle of arrival (AOA) determinations, a triangulation, a multi-angulation, a trilateration, a multi-lateration (MLAT), as examples. Any suitable algorithm may be used for determining positions of objects with respect to a set of reference points. According to various aspects, the set of reference points may be defined by the current position of the localization devices of the first set 202r of localization devices 202. In some aspects, the set of reference points may be defined within the reference coordinate system.

According to various aspects, the localization via the plurality of localization devices 202 may be based on ultra-wideband (UWB) signal transmission. As an example, each of the localization devices of the first set 202r of localization devices 202 and the second set 202a of localization devices 202 may include or may be an ultra-wideband localization device. In this case, each of the one or more objects 201 to be localized may include an ultra-wideband localization device as well. In some aspects, each of the one or more objects 201 to be localized may include an ultra-wideband tracker. Accordingly, each of the localization devices of the first set 202r of localization devices 202 and the second set 202a of localization devices 202 may include an ultra-wideband access point (also referred to as UWB access point, UWB sensor, or UWB beacon). In some aspects, a TDOA determination may be used for a localization of the ultra-wideband tracker. A propagation time of the UWB signal from the UWB tracker to each of the UWB access points may be used for a determination of a distance between the UWB tracker and each of the UWB access points. For a localization in the three-dimensional space, at least four UWB access points may be used to localize the UWB tracker based on TDOA determinations. For a TDOA localization of one or more UWB trackers, the UWB access points may be synchronized with one another. Further, an AOA determination may be used to localize the UWB tracker. Therefore, an antenna array may, wherein an angle of arrival may be determined for a signal transmitted from the UWB tracker via the respective receiving times of the signal at the antennas of the antenna array. For a localization in the three-dimensional space, at least two UWB access points may be used to localize the UWB tracker based on AOA determinations.

According to various aspects, a localization device 202 (e.g. a UWB transceiver) may determine its own position by transmitting one or more signals and receiving one or more signals back from one or more other localization devices 202 (e.g. from a plurality of other UWB transceivers). In some aspects, the localization devices 202 of the localization system 200 may be configured in a two-way-ranging setup. In another aspect, the localization devices 202 of the localization system 200 may be configured in a one-way-ranging setup. In the one-way-ranging setup, the UWB access points may be synchronized.

According to various aspects, an ultra-wideband localization device, as described herein, may be configured to send and/or receive one or more signals with a signal bandwidth exceeding 500 MHz or 20% of a corresponding arithmetic center frequency. According to various aspects, an ultra-wideband localization device, as described herein, may be configured to send and/or receive one or more signals in a frequency range from about 3.1 GHz to about 10.6 GHz.

The localization of the one or more objects 201 is described herein in some aspects based on a UWB signal transmission. However, any other suitable type of signal, signal bandwidth, and signal frequency range, and the like, may be used in the same or a similar way.

According to various aspects, the localization system 200 may be configured to determine the additional position information 213a at predefined times. The determination of the additional position information 213a may be carried out with a repetition rate of more than 1 Hz. This allows for a compensation of a movement of one or more of the additional localization devices 202 of the localization system 200. As an example, one or more of the localization devices of the second set 202a may be carried by a vehicle, e.g. by a ground moving robot, by an unmanned aerial vehicle, as examples. The setup of the localization system 200 may need only a short time even in difficult areas in the case that the one or more of the additional localization devices 202 of the localization system 200 are mobile and, despite their mobility, easily included into the depth imaging system 200 via the localization devices 202 of the first set 202r.

According to various aspects, the determination of the position 223 of each of the one or more objects 201 may be carried out at predefined times. The determination of the position 223 of each of the one or more objects 201 may be carried out with a repetition rate of more than 1 Hz. In some aspects, this allows for a control of the one or more objects 201, e.g. in the case that the one or more objects 201 may be drones of a light show. Further, the drones of a light show may be controlled based on real time localization, which may enable a control of a swarm of drones with a high drone density (e.g. a comparatively large number of drones per cubic meter).

According to various aspects, the localization system 200 may be configured to determine the positons of the additional localization devices 202 (e.g. the localization devices 202 of the second set 202a) in real time. According to various aspects, the localization system 200 may be configured to determine the positons of the all localization devices of the localization system 200 in real time. This allows for compensating movement of one or more of the localization devices 202 of the localization system 200 while determining the positions 223 of the one or more objects 201.

Figure 4A:
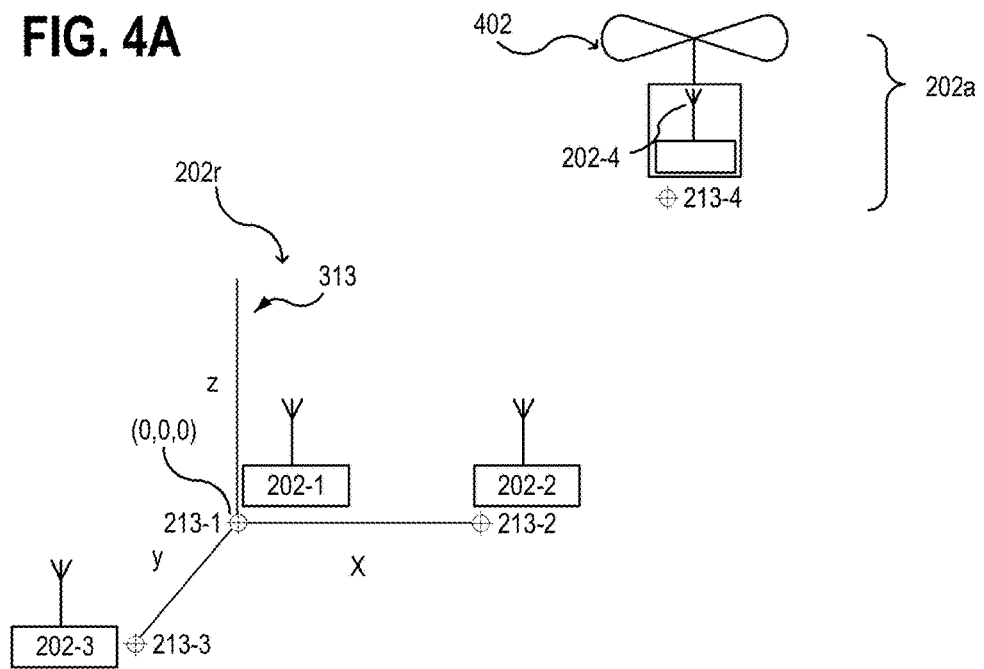
FIG. 4A and FIG. 4B show various aspects of a localization system in a schematic view.

FIG. 4A shows the localization system 200 including at least one unmanned aerial vehicle 402 configured to carry one or more localization devices 202 of the second set 202a of localization devices, according to various aspects. Only as an example, the first set 202r of localization devices may include a first localization device 202-1, a second localization device 202-2, and a third localization device 202-3 of the localization system 200. The respective localization devices of the first set 202r may be static (illustratively immobile) during the localization system 200 is operated to localize the one or more objects 201. The localization devices of the first set 202r may be, for example, arranged at a fixed position 213-1, 213-2, 213-3, e.g. on the ground. The fixed position 213-1, 213-2, 213-3 may be determined during an initial setup of the localization system 200 and used to determine the reference coordinate system 313. A fourth localization device 202-4 (e.g. an additional localization device, e.g. a localization device of the second set 202a of localization devices) may be carried by an unmanned aerial vehicle 402. The unmanned aerial vehicle 402 may be controlled to hover at a predefined position (e.g. defined by predefined GPS coordinates and, optionally, a predefined altitude) and/or fly along a predefined flight path. A current position 213-4 of the fourth localization device 202-4 (and therefore of the unmanned aerial vehicle 402) may be determined by the localization system 200 using the first set 202r of localization devices. Based on the known current 213-4 position of the fourth localization device 202-4, the localization system 200 may use all of the four localization devices 202-1, 202-2, 202-3, 202-4 for localization of objects 201. Since the fourth localization device 202-4 may change its position 213-4 during the operation of the localization system 200, the current position 213-4 of the fourth localization device 202-4 may be determined (illustratively updated) at predefined times.

In the same or a similar way, two or more additional localization devices 202 may be integrated into the localization system 200 based on the first set 202r of localization device. In the same or a similar way, the first set 202r may include four or more localization devices 202 to determine the current position 213-4 of the fourth localization device 213-4.

Figure 4B:
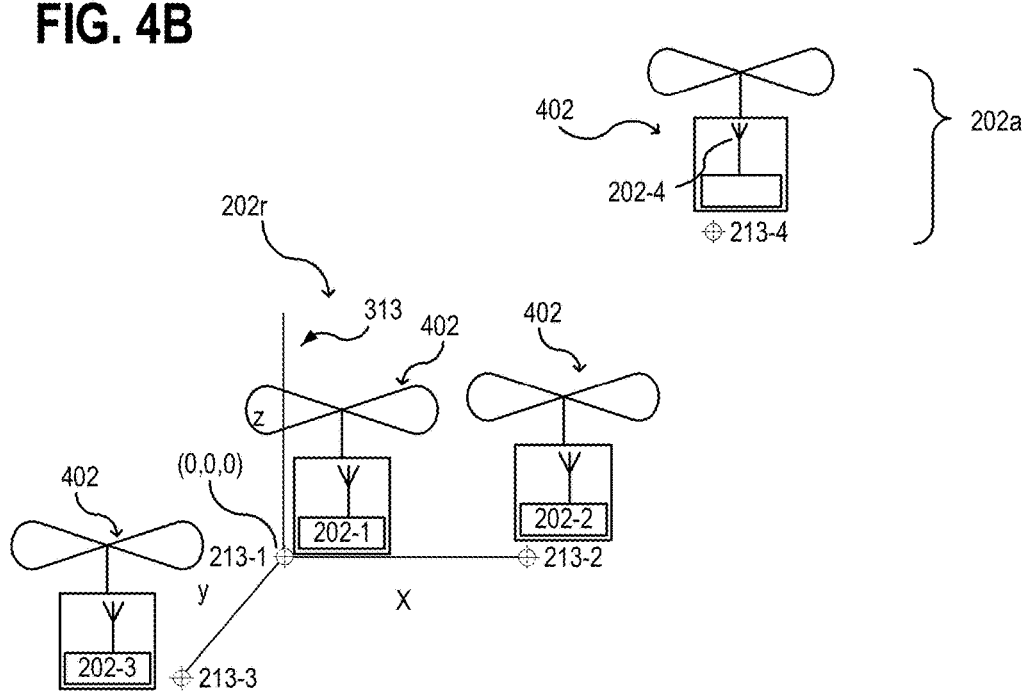

FIG. 4B shows the localization system 200 including a plurality of unmanned aerial vehicles 402 configured to carry the first localization device 202-1 of the first set 202r, the second localization device 202-2 of the first set 202r, and the third localization device 202-3 of the first set 202, according to various aspects. In a similar way, one or more ground vehicles (e.g. ground robots) may be configured to carry one or more localization devices 202 of the first set 203 of localization devices. It is understood that, in a similar way, only one or two of the localization devices of the first set 202r may be carried by a respective vehicle or that more than three localization devices of the first set 202r may be carried by a respective vehicle.

As an example, the first set 202r of localization devices may include a first localization device 202-1, a second localization device 202-2, and a third localization device 202-3. The respective localization devices 202-1, 202-2, 202-3 of the first set 202r may be mobile, e.g. mounted to a vehicle. In this case, the current positions of the respective localization devices 202-1, 202-2, 202-3 of the first set 202r may change during operation of the localization system 200. Therefore, before the first set 202r of localization devices 202 may be used for any localization of objects 201, the current positions of the respective localization devices 202-1, 202-2, 202-3 of the first set 202r may be determined at least relative to one another. As an example, the reference coordinate system 313 may be generated in the case that at least the two direction from the first localization device 202-1 to the second localization device 202-2 and from the first localization device 202-1 to the third localization device 202-3 is known. The unmanned aerial vehicles 402 carrying the respective localization devices 202-1, 202-2, 202-3 of the first set 202r may be controlled to hover at a predefined positions (e.g. defined by predefined GPS coordinates and, optionally, predefined altitudes) and/or fly along a predefined flight paths. In some aspect, the unmanned aerial vehicles 402 carrying the respective localization devices 202-1, 202-2, 202-3 of the first set 202r may be controlled to hover or fly with substantially the same altitude. Therefore, the reference plane defined by the respective localization devices 202-1, 202-2, 202-3 of the first set 202r may be aligned substantially horizontally.

Figure 5:
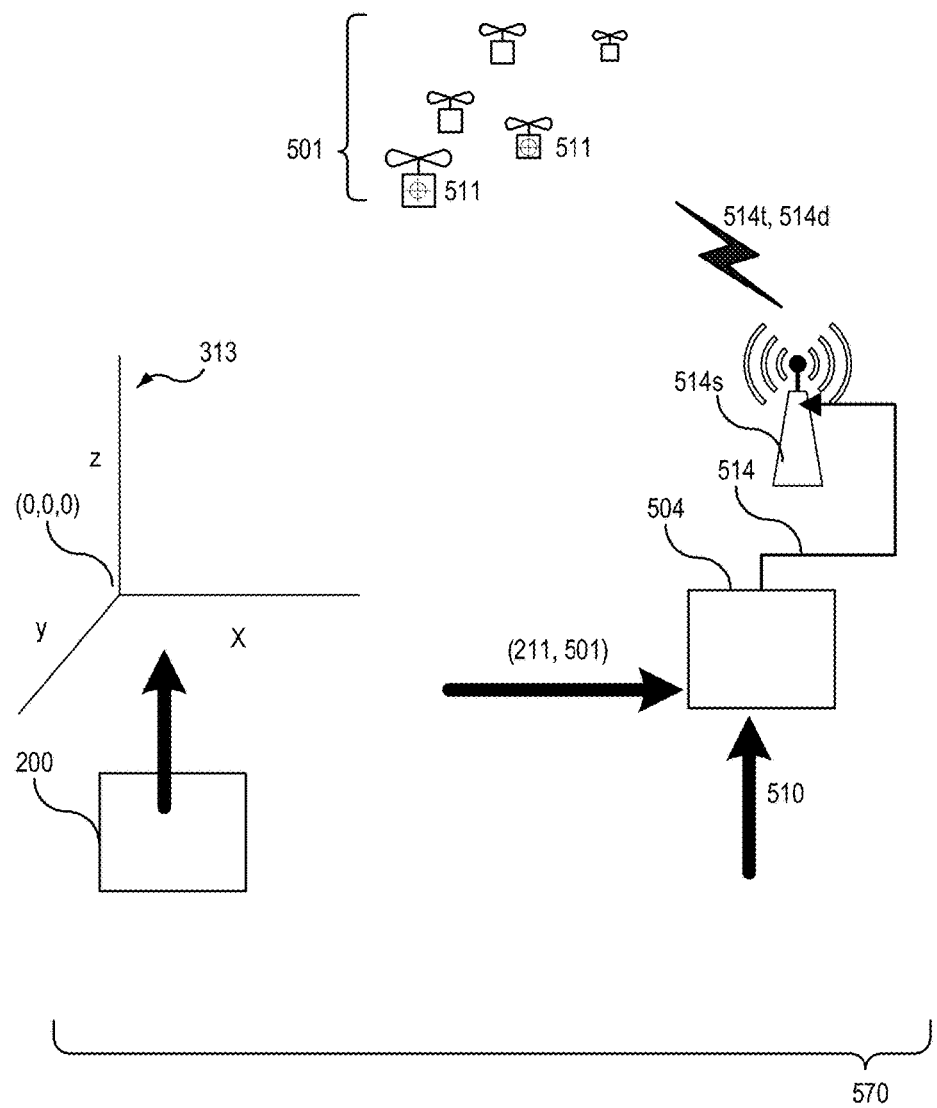
FIG. 5 schematically shows one or more unmanned aerial vehicles performing a controlled flight based on a localization via a localization system, according to various aspects.

In some aspects, the one or more objects 201 of which the respective current position 213 is to be determined via the localization system 200 may include or may be one or more unmanned aerial vehicles. FIG. 5 shows a controlled flight of one or more unmanned aerial vehicles 501 in a schematic view, according to various aspects. According to various aspects, one or more processors 504 may be configured to control 514 flight of the one or more unmanned aerial vehicles 501 based on a predefined flight plan 510. The one or more processors 504 may be part of a localization system 200, as described, for example, with reference to the localization system 200. Alternatively, any other computing system including the one or more processors 504 may be communicatively coupled to the localization system 200 and configured to control 514 flight of the one or more unmanned aerial vehicles 501. Control data 514d may be transmitted via a wireless link 514t to the one or more unmanned aerial vehicles 501. Any suitable wireless communication system 514s may be used to transmit the control data 514d form the one or more processors 504 to the one or more unmanned aerial vehicles 501.

The predefined flight plan 510 may include data representing one or more predefined flight-trajectories for each of the one or more unmanned aerial vehicles 501 within a reference coordinate system 313. The predefined flight-trajectories may include a series of target positions. In some aspects, the flight of a plurality of unmanned aerial vehicles 501 may be controlled to perform a predefined choreography (e.g. for a light show). In this case, each predefined flight-trajectory may have a time resolved series of target positions and the predefined flight-trajectories of the plurality of unmanned aerial vehicles 501 are synchronized with one another.

The reference coordinate system 313 may be defined by the localization system 200, e.g. as described herein. Further, a current position 211 of each of the one or more unmanned aerial vehicles 501 may be determined via the localization system 200 relative to the reference coordinate system 313, e.g. as described above. Illustratively, the current position 211 of each of the one or more unmanned aerial vehicles 501 may be determined via the localization system 200 within the reference coordinate system 313 and a corresponding target position within the reference coordinate system 313 may be received (e.g. as part of the pre-defined flight plan 510) for each of the one or more unmanned aerial vehicles 501, and, based thereon, movement of the one or more unmanned aerial vehicles 501 may be controlled from the respective current position 211 to the respective target position.

According to various aspects, both the current positions 511 of the one or more unmanned aerial vehicles 501 and the target position for each of the one or more unmanned aerial vehicles 501 may be determined relative to the reference coordinate system 313. Therefore, the actual position of the reference coordinate system 313 may be defined by the actual position of the corresponding first set 202*r* of localization devices 202 of the localization system 200. A movement of the first set 202*r* of localization devices 202 may lead to a movement of the reference coordinate system 313. However, the flight of a plurality of unmanned aerial vehicles 501 relative to one another may not be influence by a movement of the reference coordinate system 313. Therefore, a predefined choreography may be performed independently of the position of the reference coordinate system 313 but the overall position of the predefined choreography can be controlled by positioning the first set 202*r* of localization devices 202 accordingly in the three dimensional space.

According to various aspects, the controlled flight of one or more vehicles (e.g. of the one or more unmanned aerial vehicles 501 illustrated in FIG. 5) may be obtained via a vehicle control system 570. The vehicle control system 570 may include reference localization devices (e.g. the first set 202*r* of localization devices 202 in FIG. 2, e.g. the first localization device 202-1, the second localization device 202-2, and the third localization device 202-3 in FIGS. 3, 4A and 4B) configured to provide reference position information representing a positional relationship of the reference localization devices relative to one another. The vehicle control system 570 may be configured to determine a reference coordinate system 313 based on the reference position information provided by the reference localization devices, determine a current position of each of one or more vehicles within the reference coordinate system 313, receive a target position for each of the one or more vehicles 501 within the reference coordinate system 313, and control 514 movement of the one or more vehicles 501 from the respective current position to the respective target position.

According to various aspects, the controlled flight of one or more vehicles (e.g. of the one or more unmanned aerial vehicles 501 illustrated in FIG. 5) may be obtained via a vehicle control system 570. The vehicle control system 570 may include a plurality of reference localization devices (e.g. the first set 202*r* of localization devices 202 in FIG. 2, e.g. the first localization device 202-1, the second localization device 202-2, and the third localization device 202-3 in FIGS. 3, 4A and 4B). The vehicle control system 570 may be configured to (e.g. via one or more processors) determine a positional relationship of the plurality of reference localization devices relative to one another, determine a reference coordinate system based on the determined positional relationship, determine a current position for each of one or more vehicles within the reference coordinate system, receive data representing a target position for each of the one or more vehicles within the reference coordinate system, and control movement of each of the one or more vehicles from the respective current position to the respective target position.

Figure 6:
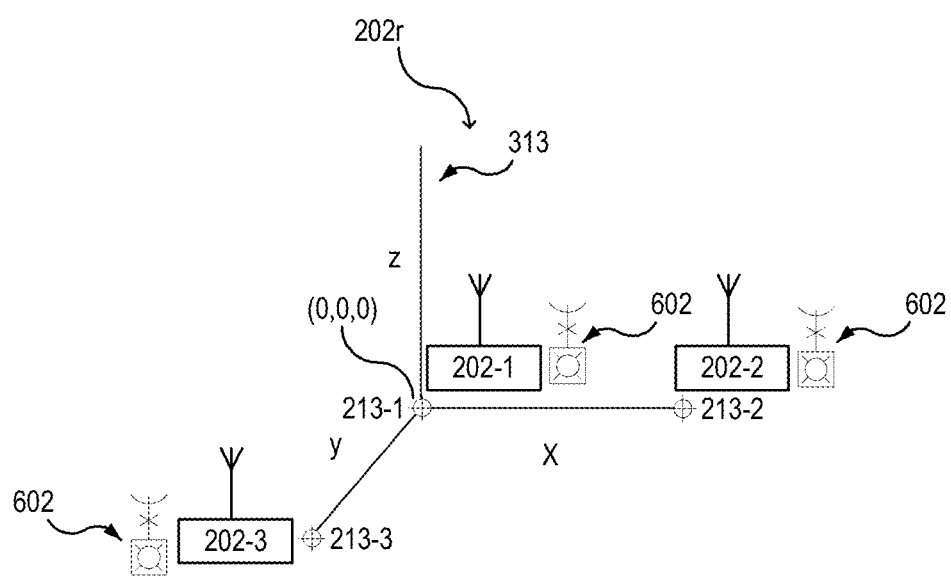
FIG. 6 shows various aspects of a localizing one or more localization devices of a localization system in a schematic view.

FIG. 6 shows exemplarily a first set 202*r* of localization devices 202 defining a reference coordinate system 313, according to various aspects. The first set 202*r* of localization devices 202 may include a first localization device 202-1 at a first position 213-1, a second localization device 202-2 at a second position 213-2, and a third localization device 202-2 at a third position 213-3. As described above, the positions 213-1, 213-2, 213-3 of the localization devices 202-1, 202-2, 202-3 may define the origin 313 (0,0,0) of the reference coordinate system 313 and the three axis X, Y, Z. It has to be noted that the reference coordinate system 313 may be a Cartesian coordinate system; however, other coordinate systems (e.g. a spherical coordinate system, a cylindrical coordinate system, as examples) may be used in a similar way.

In some aspects, the three localization devices 202 may be mobile, e.g. each mounted to an unmanned aerial vehicle. Therefore, the current positions 213-1, 213-2, 213-3 of the localization devices 202-1, 202-2, 202-3 may be determined to consider a possible movement of the localization devices 202-1, 202-2, 202-3 during the localization system 200 is operated.

According to various aspects, one or more further localization devices 602 may be assigned to one or more localization devices of the first set 202*r* of localization devices 202 to determine at least a part of the reference position information 213*r*.

According to various aspects, the one or more further localization devices 602 may be have a different localization principle that the localization devices 202 of the first set 202*r* and the second set 202*a*. In some aspects, the one or more further localization devices 602 may be configured to operate at a greater maximal localization range than the localization devices 202-1, 202-2, 202-3. As an example, a further localization device 602 may include or may be a GPS (Global Positioning system) tracker. According to various aspects, a maximal localization range of the localization devices 202 of the first set 202*r* and the second set 202*a* may be in the range from about 100 m to about 500 m. The smaller the maximal localization range of the localization devices 202 of the first set 202*r* and the second set 202*a* the greater the localization precision. Therefore, the localization system 200 may realize two aspects: a first localization precision may be achieved within a first localization range and a second localization precision less than the first localization precision may be used within a second localization range greater than the first localization range. Illustratively, a position of the localization devices 202-1, 202-2, 202-3 defining the reference coordinate system 313 in an outdoor area may be controlled based on a localization via the one or more further localization devices 602 (with the second localization precision, e.g. less than about 5 m, e.g. less than about 1 m) and a position of one or more unmanned aerial vehicles 501 (see, for example, FIG. 5) may be controlled based on a localization via the localization devices 202 of the first set 202*r* and the second set 202*a* (with the first localization precision, e.g. less than about 1 m, e.g. less than about 50 cm).

Various aspects of a localization system and/or a vehicle control system are described in the following, e.g. with reference to FIGS. 7A to 7C, exemplarily based on an UWB localization system that is used to localize (in other words to determine a location) a plurality of unmanned aerial vehicles. However, it is understood that other vehicles than unmanned aerial vehicle may be localized and/or control in the same or a similar way. Further, it is understood that any other localization system may be used instead of the UWB localization system in the same or a similar way.

According to various aspects, a UWB localization system is provided, e.g. for use in indoor or outdoor light shows based on flying unmanned aerial vehicles. FIG. 7A shows a UWB localization system 700 in a schematic view, according to various aspects.

According to various aspects, the UWB localization system 700 may include three UWB sensors 702-1, 702-2, 702-3. The three UWB sensors 702-1, 702-2, 702-3 may define a UWB coordinate frame 713 (also referred to as reference coordinate system or coordinate frame). In some aspects, the three UWB sensors 702-1, 702-2, 702-3 may be located on the ground, as illustrated in FIG. 7A. However, one, more, or all of the three UWB sensors 702-1, 702-2, 702-3 may be mounted at a corresponding vehicle, e.g. on an unmanned aerial vehicle (see, for example, FIG. 7B and/or FIG. 7C). The first UWB sensor 702-1 may define the origin of the coordinate frame 713. The line from the first UWB sensor 702-1 to the second UWB sensor 702-2 may define a vector of an x-axis. The line from first UWB sensor 702-1 to the third UWB sensor 702-3 may define a vector of a y-axis. The plane built by the two vectors may define an xy-plane. Thus, the third sensor 702-3 may not necessarily have to be on an exactly perpendicular line with respect to the x-axis. A vector of a z-axis may be defined by the xy-plane, e.g. perpendicular to the xy-plane (determined by the right-hand rule). Illustratively, the three UWB sensors 702-1, 702-2, 702-3 may define a reference system, e.g. a reference system 200 as described above with respect to the localization system 200. In addition to the three (reference) UWB sensors 702-1, 702-2, 702-3, a set of additional UWB sensors 702-4, 702-5, 702-6 may be located somewhere in the three-dimensional space. Each additional UWB sensor of the set of additional UWB sensors 702-4, 702-5, 702-6 may be located outside of the planes (e.g. the xy-plane, the xz-plane, and the yz-plane) defined by the coordinate frame 713. According to various aspects, the additional UWB sensors 702-4, 702-5, 702-6 may be used (e.g. together with the three reference UWB sensors 702-1, 702-2, 702-3) for an accurate localization calculation.

According to various aspects, the UWB localization system 700 may be configured to allow for a determination (e.g. measurement) of the distance between each of the UWB sensors 702-1, 702-2, 702-3, 702-4, 702-5, 702-6. Since the coordinate frame 713 is used, defined by the corresponding three UWB sensors 702-1, 702-2, 702-3, the locations of all additional UWB sensors 702-4, 702-5, 702-6 does not have to be previously known and does not have to be fixed. According to various aspects, the locations of all UWB sensors of the UWB localization system 700 (and trackers as well) may be determined (e.g. estimated) in real time.

By the capability of a continuous estimation of the positions of all UWB sensors and UWB trackers, it is not require that the UWB sensors have to be arranged at a fixed location. According to some aspects, the additional UWB sensors 702-4, 702-5, 702-6 may be mounted at mobile systems (e.g. at corresponding unmanned aerial vehicles 712-4, 712-5, 712-6) and a valid UWB localization setup is realized. In some aspects, it may not be necessary anymore to mount additional sensors/trackers prior to the use of the UWB localization system 700. Further, the UWB localization system 700 may be used in locations (e.g. outdoor) where no ceilings and/or walls are available for mounting the additional sensors/trackers, e.g. in large parks, in parking lots, and/or meadows. According to various aspects, the number of UWB sensors in the UWB localization system 700 may substantially define the localization accuracy, i.e. the localization accuracy may increase for an increasing number of UWB sensors used.

According to various aspects, the UWB localization system 700 may be used to determine a position of (in other words to localize 715) a plurality of unmanned aerial vehicles 701. This allows for a precise control of the flight of the plurality of unmanned aerial vehicles 701 in accordance with a predefined flight plan.

According to various aspects, the UWB localization system 700 may be part of a vehicle control system. As an example, a vehicle control system 770 may include a set of localization devices (e.g. the UWB sensors) 702-1, 702-2, 702-3, 702-4, 702-5, 702-6 including at least three reference localization devices 702-1, 702-2, 702-3 and at least one additional localization device 702-4, 702-5, 702-6. The at least three reference localization devices 702-1, 702-2, 702-3 may be configured to provide reference position information representing a positional relationship of the at least one additional localization device 702-4, 702-5, 702-6 relative to the at least three reference localization devices 702-1, 702-2, 702-3, and one or more (e.g. all) localization devices of the set of localization devices 702-1, 702-2, 702-3, 702-4, 702-5, 702-6 are configured to provide vehicle position information representing a positional relationship of one or more vehicles 701 relative to the one or more localization devices of the set of localization devices 702-1, 702-2, 702-3, 702-4, 702-5, 702-6.

According to various aspects, the vehicle control system 770 may include one or more processors 704 configured to: determine a reference coordinate system 713 based on the reference position information provided by the at least three reference localization devices 702-1, 702-2, 702-3, determine a current position of each of the one or more vehicles 701 within the reference coordinate system 713 based on the vehicle position information provided by the one or more localization devices of the set of localization devices 702-1, 702-2, 702-3, 702-4, 702-5, 702-6, receive a target position for each of the one or more vehicles 701 within the reference coordinate system 713, and control movement of the one or more vehicles 701 from the respective current position to the respective target position (see, for example, FIG. 5).

According to various aspects, based on the use of the UWB coordinate frame 713, as for example described herein, the three reference UBW sensors 702-1, 702-2, 702-3 may not be mounted at a fixed location. As an example, the three reference UBW sensors 702-1, 702-2, 702-3 may be carried by corresponding vehicles. As illustrated, for example, in FIG. 7B, each of the three reference UBW sensors 702-1, 702-2, 702-3 may be carried by a corresponding unmanned aerial vehicle 712-1, 712-2, 712-3. The three (reference) unmanned aerial vehicles 712-1, 712-2, 712-3 may be controlled to fly and/or hover at corresponding positions in the sky, and the UWB coordinate frame 713 may move and/or may be positioned with the three corresponding unmanned aerial vehicles 712-1, 712-2, 712-3.

Figure 7A:
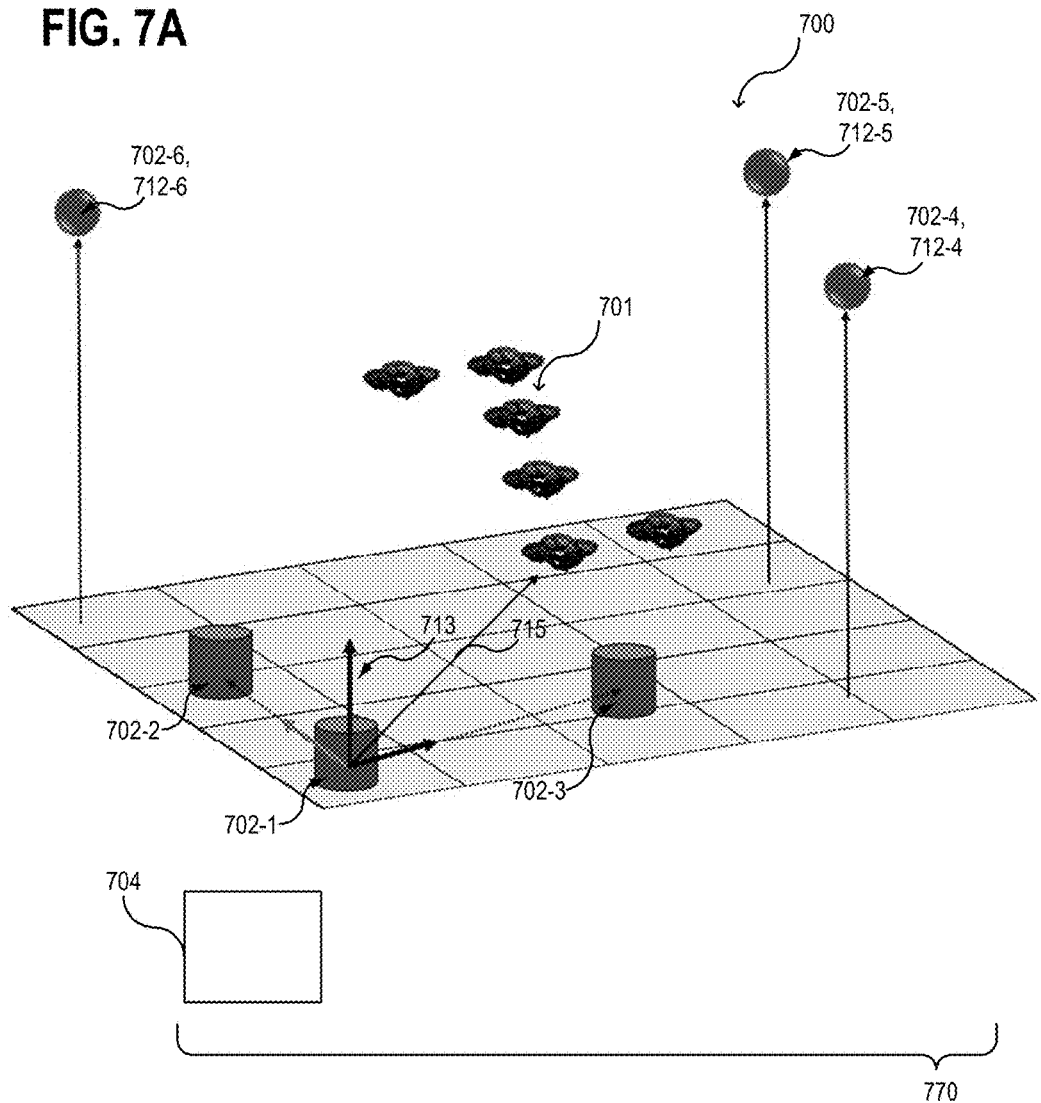
Figure 7B:
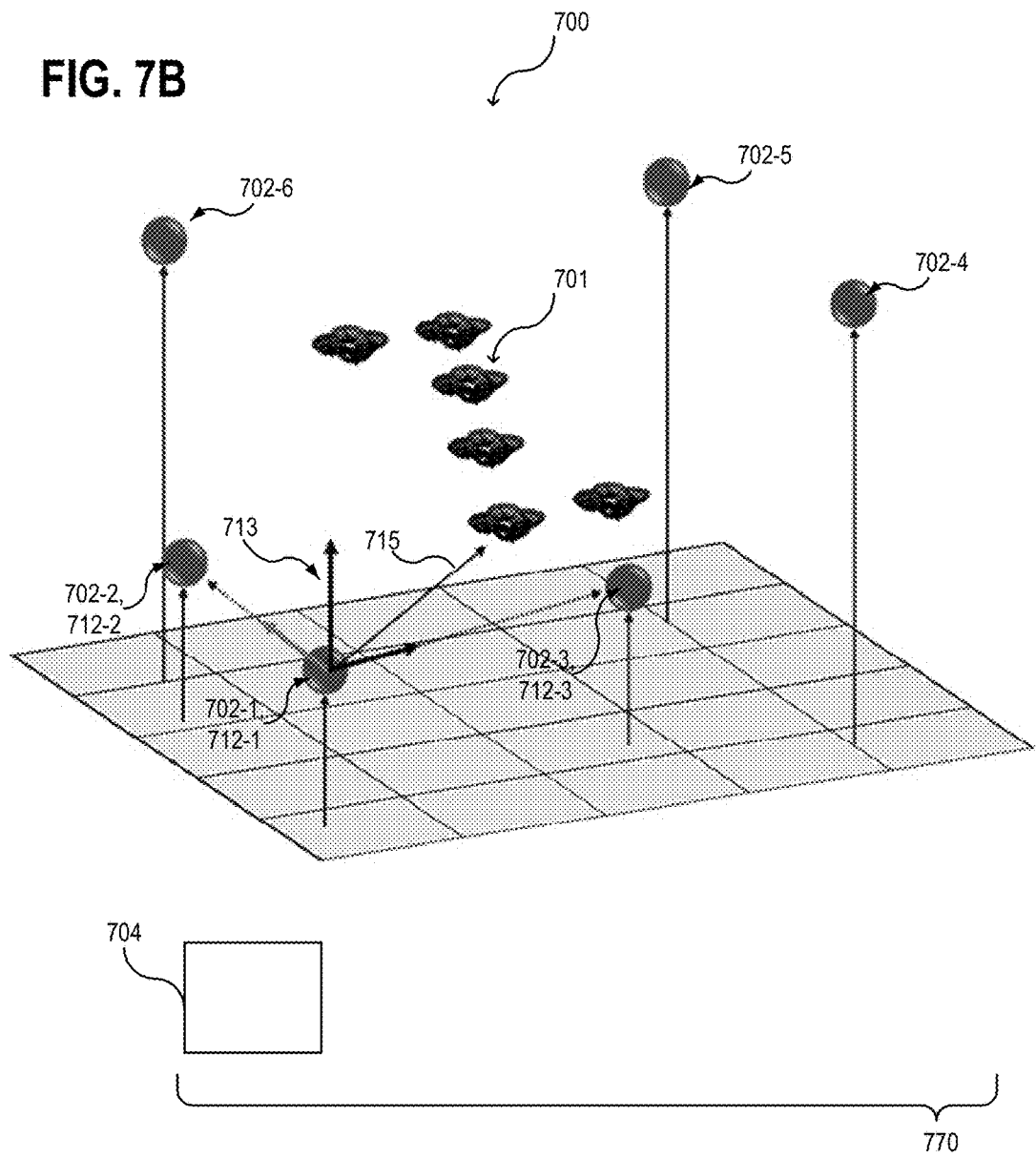

As illustrated exemplarily in FIG. 7A and FIG. 7B, a vehicle control system 770 may include a set of localization devices 702-1, 702-2, 702-3, 702-4, 702-5, 702-6 including at least three reference localization devices 702-1, 702-2, 702-3. The at least three reference localization devices 702-1, 702-2, 702-3 may be configured to provide reference position information representing a positional relationship of the at least three reference localization devices 702-1, 702-2, 702-3 relative to one another. Further, one or more localization devices of the set of localization devices 702-1, 702-2, 702-3, 702-4, 702-5, 702-6 may be configured to provide vehicle position information representing a positional relationship of one or more vehicles 701 relative to the one or more localization devices of set of localization devices 702-1, 702-2, 702-3, 702-4, 702-5, 702-6. According to various aspects, one or more processors 704 of the vehicle control system 770 may be configured to determine a reference coordinate system 713 based on the reference position information provided by the at least three reference localization devices 702-1, 702-2, 702-3. The reference position information may represent the position of each of the at least three reference localization devices 702-1, 702-2, 702-3. According to various aspects, the one or more processors 704 may be further configured to determine a current position of each of the one or more vehicles 701 within the reference coordinate system 713 based on the vehicle position information provided by the one or more localization devices of the set of localization devices. According to various aspects, the one or more processors 704 may be further configured to receive a target position for each of the one or more vehicles 701 within the reference coordinate system 713. According to various aspects, the one or more processors 704 may be further configured to control movement of the one or more vehicles 701, e.g. from the respective current position to the respective target position.

It should be noted that the stability of the coordinate frame 713 is only as stable as the positions of the unmanned aerial vehicles carrying the (reference) UWB sensors 702-1, 702-2, 702-3. If the unmanned aerial vehicles 712-1, 712-2, 712-3 would move or oscillate (e.g. within ±1 m), the coordinate frame 713 would follow such a movement or oscillation. But the location of the unmanned aerial vehicles 701 to be localized by the UWB localization system 700 and/or controlled by the vehicle control system 770 would be still within the UWB precision inside the UWB coordinate frame 713 (see, for example, FIG. 7C).

FIG. 7C shows a GPS controlled positioning of a UWB coordinate frame 713 in a three-dimensional space, according to various aspects. According to various aspects, a GPS localization may be used to determine a position of the UWB coordinate frame 713 in GPS coordinates. The UWB coordinate frame 713 may move, over time, from a first position 733-1 to a second position 733-2. This may be regarded as an error of the position of the UWB coordinate frame 713 due to the limits of the GPS localization and/or due to limits in the ability to keep the UWB coordinate frame 713 at a fixed position. However, since the localization and/or the control of the unmanned aerial vehicles 701 may be implemented relative to the UWB coordinate frame 713, the unmanned aerial vehicles 701 may be still controlled precisely in accordance with an overall flight plan for the unmanned aerial vehicles 701.

As an example, a light show may include unmanned aerial vehicles 701 controlled via the vehicle control system 770 as described herein or via a similar control system. The unmanned aerial vehicles 701 performing a predefined choreography for the light show may be controlled for example via any suitable control system including a precise localization based on the localization system 200 or the UWB localization system 700 described exemplarily herein. In the case that a predefined scene should be displayed by the unmanned aerial vehicles 701, e.g. a happy face, with a position error of the respective unmanned aerial vehicles of less than 0.1 m (e.g. with a high accuracy), the GPS accuracy for localizing the (e.g. three) reference unmanned aerial vehicles that carry the UWB localization devices defining the UWB coordinate frame 713 may be low, e.g. only 5 m, the UWB accuracy remain as expected and the scene, e.g. the happy face, would possibly oscillate with ±5 m, but the display of the scene would still be as desired.

Illustratively, the position error of one unmanned aerial vehicles 701 to another one of the unmanned aerial vehicles 701 of the light show may be defined by the precision of the UWB, which may be higher than the precision of the GPS localization.

According to various aspects, the localization system described herein may extend the usage of UWB localization to any outdoor situation. Drone light shows moving through the sky may display highly detailed and precise shapes with lightweight drones. The lightweight drones may only carry a UWB tracker for their localization.

According to various aspects, an additional UWB sensor may be any UWB sensor that is not relevant for a definition of the (base) coordinate frame 713. A UWB sensor may be any localization device that is a part of a UWB tracking system configured to localize a UWB tracker. According to various aspects, a first type of unmanned aerial vehicles may carry the UWB sensors (e.g. the localization devices of the first set 202r and of the second set 202a, e.g. the UWB reference sensors 702-1, 702-2, 702-3 and the additional UWB sensors 702-4, 702-5, 702-6) and a second type of unmanned aerial vehicles 701 (e.g. the unmanned aerial vehicles to be controlled) may carry UWB trackers.

According to various aspects, the functions of a UWB tracker and the functions of a UWB sensor (also referred to as UWB access point) may be implemented using the same localization device. The operation of the localization device may be carried out to realize a valid UWB localization setup.

FIG. 8 shows a flow diagram of a method 800 for controlling one or more vehicles (e.g. one or more unmanned aerial vehicles), according to various aspects. The method 800 may include: in 810, determining reference position information representing a positional relationship of a at least three reference localization devices of a set of localization devices relative to one another; in 820, determining vehicle position information representing a positional relationship of one or more vehicles relative to one or more localization devices of the set localization devices; in 830, determining a reference coordinate system based on the reference position information provided by the at least three reference localization devices; in 840, determining a current position of each of the one or more vehicles within the reference coordinate system based on the vehicle position information provided by the one or more localization devices of the set of localization devices; in 850, determining a target position for each of the one or more vehicles within the reference coordinate system; and, in 860, controlling movement of the one or more vehicles from the respective current position to the respective target position.

FIG. 9 shows a flow diagram of a method 900 for controlling one or more vehicles (e.g. one or more unmanned aerial vehicles), according to various aspects. The method 900 may include: in 910, determining reference position information representing a positional relationship of at least three reference localization devices of a set of localization devices relative to one another; in 920, determining reference position information representing a positional relationship of a at least one additional localization device of the set of localization devices relative to the at least three reference localization devices; in 930, determining vehicle position information representing a positional relationship of one or more vehicles relative to the set of localization devices; in 940, determining a reference coordinate system based on the reference position information provided by the at least three reference localization devices; in 950, determining a current position of each of the one or more vehicles within the reference coordinate system based on the vehicle position information; in 960, determining a target position for each of the one or more vehicles within the reference coordinate system; and, in 970, controlling movement of the one or more vehicles from the respective current position to the respective target position.

Figure 10:
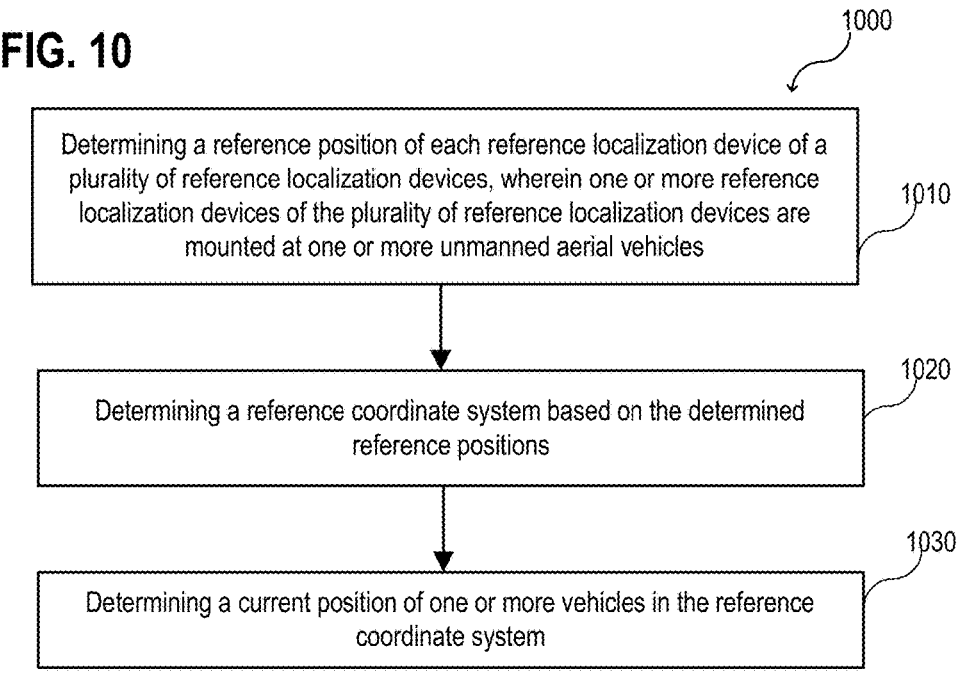
FIG. 10 shows a method for localizing one or more vehicles in a schematic flow diagram, according to various aspects.

FIG. 10 shows a flow diagram of a method 1000 for localizing one or more vehicles (e.g. one or more unmanned aerial vehicles), according to various aspects. The method 1000 may include: in 1010, determining a reference position of each reference localization device of a plurality of reference localization devices, wherein one or more reference localization devices of the plurality of reference localization devices are mounted at one or more unmanned aerial vehicles; in 1020, determining a reference coordinate system based on the determined reference positions; in 1030, determining a current position of one or more vehicles in the reference coordinate system.

Figure 11:
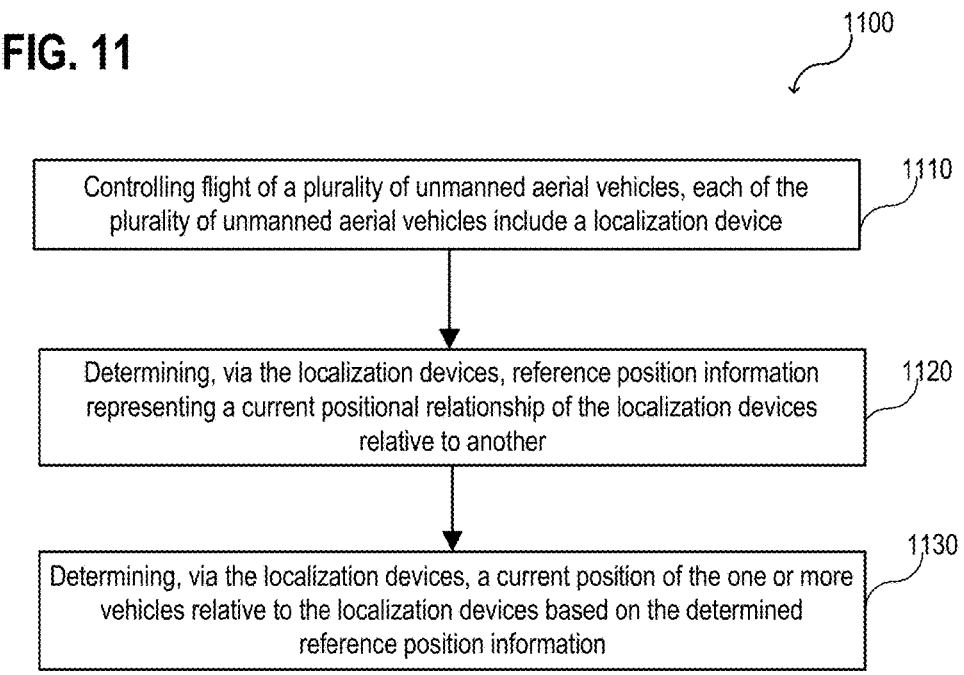
FIG. 11 shows a method for localizing one or more vehicles in a schematic flow diagram, according to various aspects.

FIG. 11 shows a flow diagram of a method 1100 for localizing one or more vehicles (e.g. one or more unmanned aerial vehicles), according to various aspects. The method 1100 may include: in 1110, controlling flight of a plurality of unmanned aerial vehicles, each of the plurality of unmanned aerial vehicles include a localization device; in 1120, determining, via the localization devices, reference position information representing a current positional relationship of the localization devices relative to another; and, in 1130, determining, via the localization devices, a current position of the one or more vehicles relative to the localization devices based on the determined reference position information.

According to various aspects, the reference position information may be determined at predefined times, and the current position of each of the one or more objects may be determined at predefined times.

Figure 12:
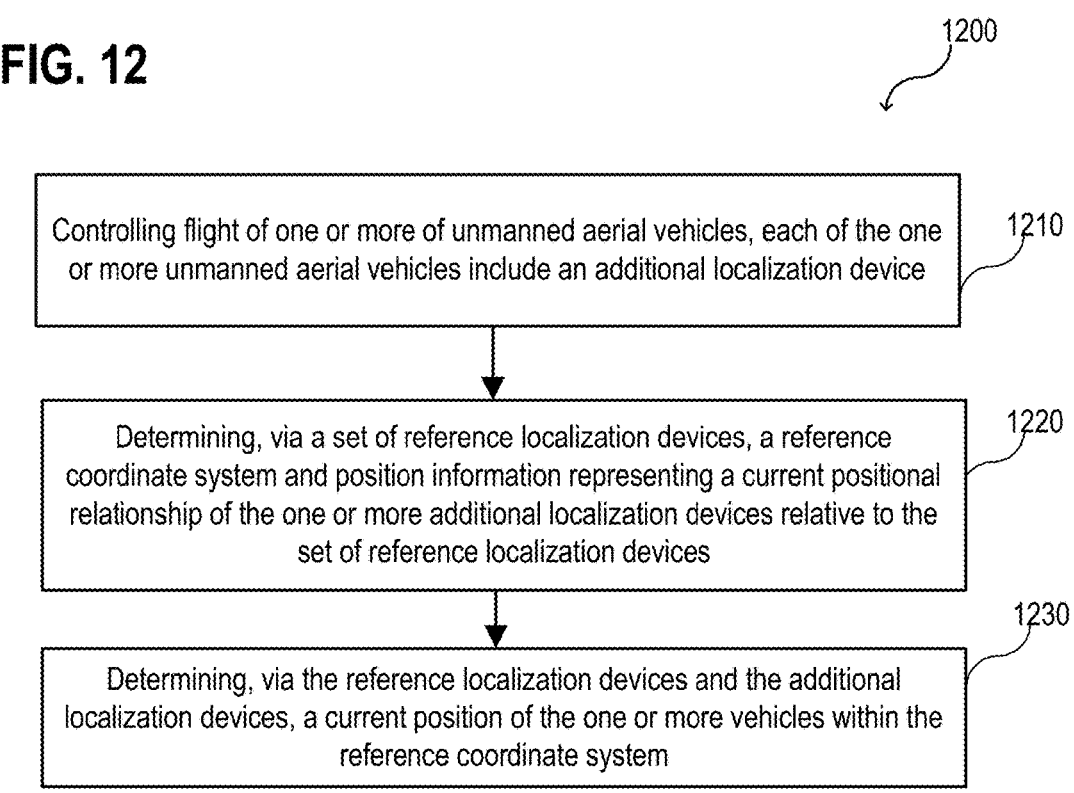
FIG. 12 shows a method for localizing one or more vehicles in a schematic flow diagram, according to various aspects.

FIG. 12 shows a flow diagram of a method 1200 for localizing one or more vehicles (e.g. one or more unmanned aerial vehicles), according to various aspects. The method 1200 may include: in 1210, controlling flight of one or more of unmanned aerial vehicles, each of the one or more unmanned aerial vehicles include an additional localization device; in 1220, determining, via a set of reference localization devices, a reference coordinate system and position information representing a current positional relationship of the one or more additional localization devices relative to the set of reference localization devices; and, in 1230, determining, via the reference localization devices and the additional localization devices, a current position of the one or more vehicles within the reference coordinate system.

According to various aspects, the position information may be determined at predefined times. Further, the current position of each of the one or more objects may be determined at predefined times. According to various aspects, position information (e.g. reference position information, vehicle position information, and the like) as used herein may include any type of information representing one or more distances, one or more angles, one or more distance differences, as examples.

FIG. 13A to FIG. 13E shows various aspects of localizing one or more objects in schematic views. According to various aspects, a localization algorithm 1300 may be provided. The localization algorithm 1300 may be implemented in any suitable localization system (e.g. the localization system 200 described herein) or control system (e.g. the vehicle control system 570, 770 described herein).

In the following, one or more aspects are described with reference to an ultra-wideband (UWB) based position estimation. However, it is noted that any other suitable position estimation may be used in a similar way or on the same way. According to various aspects, an UWB localization system may be configured to operate as standalone localization system. Objects may be tracked by trackers (one tracker may be assigned to one of the objects) inside a sensor grid. The sensor grid may be formed by a set of localization devices, e.g. a set of UWB sensors. From a technological background, trackers and sensors may be built by the same hardware (also referred to as localization device) and may run on the same software track. The terms "sensor" and "tracker" may be defined by their respective main function. However, a sensor may be tracked as well by other sensors and/or a tracker may be used as a sensor.

In one aspect, a UWB localization may include calculating a distance from one localization device to another one by sending one or more signals and measuring the one or more signals time of flight (TOF). It may be implementation specific whether the sensor or the tracker may be the one sending the one or more signals or calculating the distance and/or where in the overall setup the computation is done.

According to various aspects, a UWB localization system may include three initial sensors to compute a basic plane 1311 and define a local coordinate system $\text{Ref}_{local}$ (also referred to as its basic coordinate system) in it, as described with reference to FIGS. 13A to 13E. These three initial sensors are referred to as S1, S2, and S3 in the following. The initial sensors may be referred to herein as reference localization devices. In order to eliminate ambiguous position estimations on trackers, the UWB localization system may include at least one sensor positioned outside the basic plane 1311. The at least one sensor positioned outside the basic plane 1311 may be referred to herein as at least one additional sensor or at least one additional localization device. According to some aspects, a knowledge whether the at least one additional sensor is positioned above or below the basic plane 1311 may be required before a localization of one or more objects may be carried out. For the sake of redundancy, error elimination, and/or a higher estimation quality, more than one additional sensor is used outside the basic plane 1311. Thus, the one or more additional sensors may be referred to herein as S4\* in the following. The decision whether only one or more than one additional sensor is used may be implementation specific. According to various aspects, the term localization as used herein may include a position estimation.

According to various aspects, an algorithmic estimation of positions of sensors Sx and/or trackers Ty may be performed sequentially or in different consolidated approaches. According to various aspects, the UWB localization or any other similar algorithmic localization may be used in addition with a GPS or differential GPS localization.

According to various aspects, a UWB localization may include:
 estimation of a position of a local coordinate system $\text{Ref}_{local}$ (also referred to as basic coordinate system, basic coordinate frame, and/or reference coordinate system) with respect to a global coordinate system $\text{Ref}_{global}$ (a geographic coordinate system, e.g. based on GPS or differential GPS localization);
 estimation of a position of one or more additional sensor(s) S4\* with respect to the local coordinate system $\text{Ref}_{local}$; and
 estimation of a position of one or more trackers Ty with respect to the local coordinate system $\text{Ref}_{local}$.

According to various aspects, the three initial sensors S1 to S3 may be used for the estimation of the position of the local coordinate system $\text{Ref}_{local}$. According to various aspects, the three initial sensors S1 to S3 may be used for the estimation of the position of the one or more additional sensor(s) S4* with respect to the local coordinate system Ref$_{local}$. According to various aspects, the three initial sensors S1 to S3 and the one or more additional sensor(s) S4* may be used for the estimation of the position of the one or more trackers Ty with respect to the local coordinate system Ref$_{local}$.

Figure 13A:
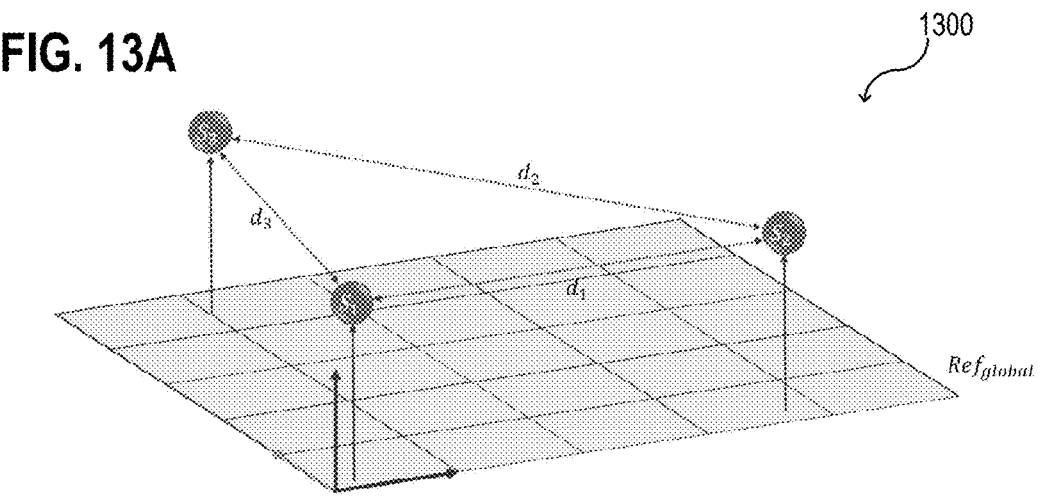
FIG. 13A to FIG. 13E show various aspects of localizing one or more trackers via a plurality of sensors, according to various aspects.
Figure 13B:
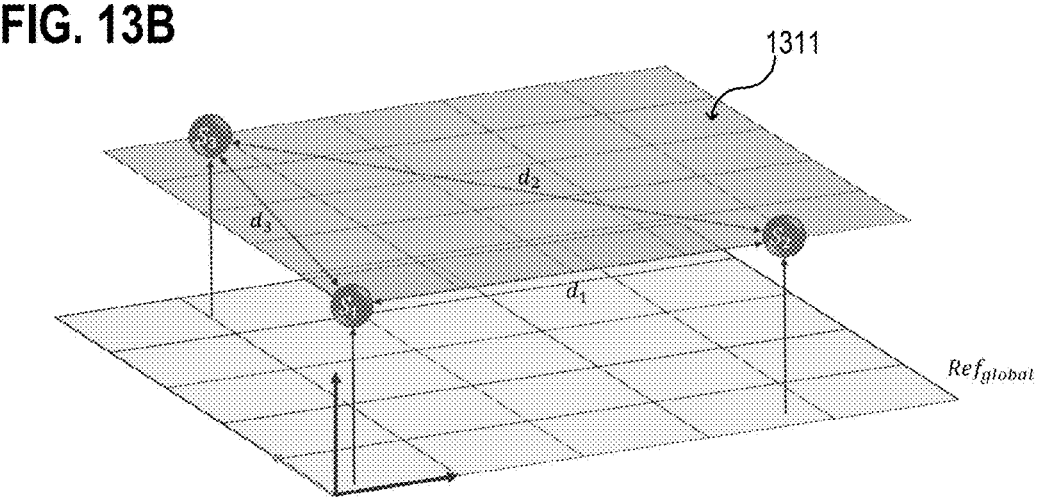

According to various aspects, a localization system may include one or more processors configured to define the basic plane 1311 via the three initial sensors S1, S2, S3, as illustrated, for example, in FIG. 13A and FIG. 13B. The three initial sensors S1, S2, S3 may be positioned (e.g. each sensor may be mounted to a corresponding vehicle), for example, at predefined positions in the three dimensional space. According to various aspects, the three initial sensors S1, S2, S3 may be positioned to form substantially a right-angled triangle. According to various aspects, the basic plane 1311 of the local coordinate system Ref$_{local}$ may be determined, for example, by measuring the distances d1 to d3 between each pair of initial sensors and applying basic mathematics (e.g. a fixed triangle may be calculated defining the basic plane 1311).

Figure 13C:
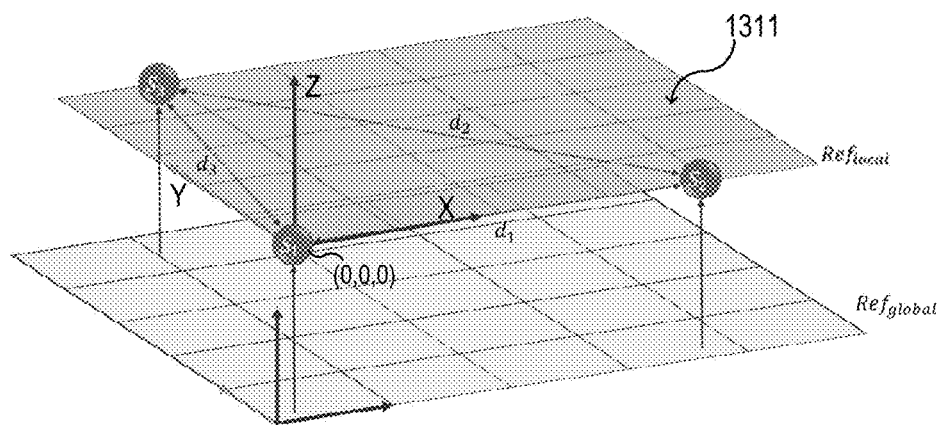

According to various aspects, a localization system may include one or more processors configured to define the local coordinate system Ref$_{local}$, as illustrated, for example, in FIG. 13C. According to various aspects, a Cartesian coordinate system may be used as the local coordinate system Ref$_{local}$. As an example, applying the right hand rule, starting with the first initial sensor S1 as the point p$_{local}$ (0,0,0), the local coordinate system Ref$_{local}$ may be defined. The x-axis X may point towards the second initial sensor S2 and the y-axis Y may point towards third initial sensor S3. It is noted that the y-axis Y may be perpendicular to the x-axis X and may lie within the basic plane 1311. Thus, the y-axis Y may not necessarily cross the third initial sensor S3. However, the local coordinate system Ref$_{local}$ may be defined by the third initial sensor S3, wherein the z-axis Z may be perpendicular to the x-axis X and the y-axis Y.

Figure 13D:
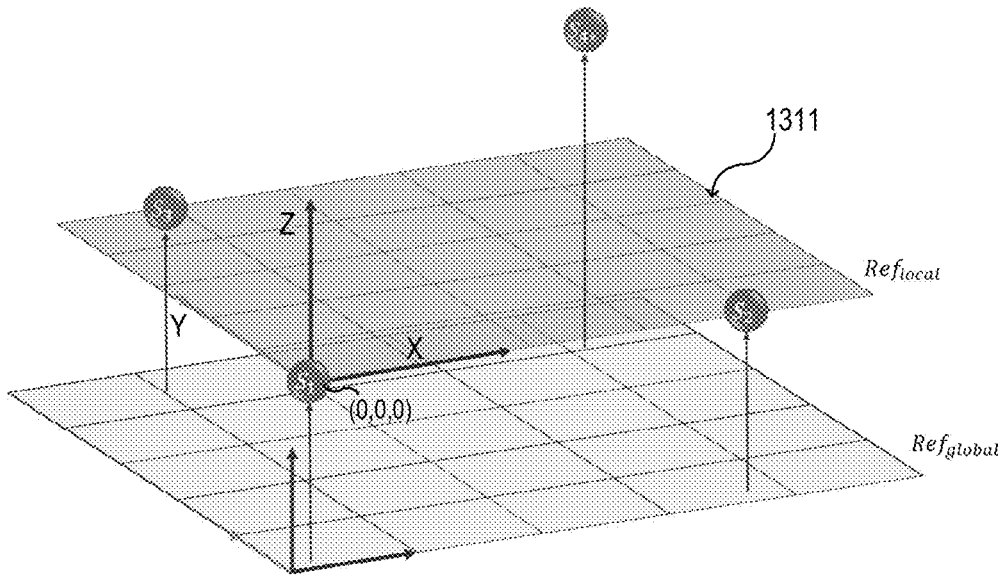

According to various aspects, a localization system may include one or more processors configured to eliminate ambiguity with respect to a position of an object relative to the local coordinate system Ref$_{local}$, as illustrated, for example, in FIG. 13D. By definition, the additional sensor S4* may be known to be either above or below the basic plane 1311 and thus either above or below the xy-plane of the local coordinate system Ref$_{local}$. Thus, according to various aspects, the position of the additional sensor S4* may be determined via the three initial sensors S1, S2, S3. As a result, a position of all other sensors and trackers may be estimated unambiguously in the local coordinate system Ref$_{local}$.

Figure 13E:
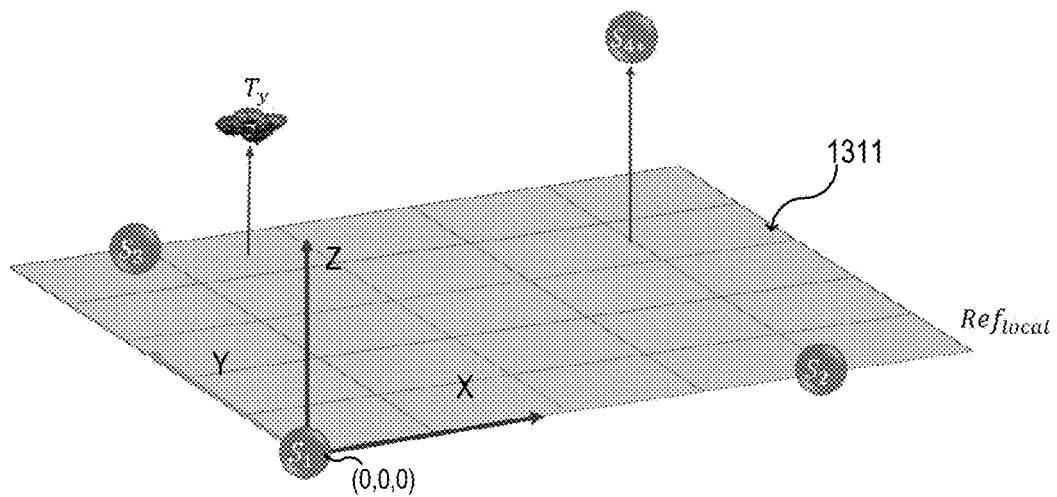

According to various aspects, a localization system may include one or more processors configured to localize (e.g. estimate a position of) one or more objects (e.g. the trackers Ty) within to the local coordinate system Ref$_{local}$, as illustrated, for example, in FIG. 13E. According to various aspects, the position of each tracker Ty may be estimated with respect to the local coordinate system Ref$_{local}$, e.g. by computing the distances towards other sensors and/or trackers. According to various aspects, instead of determining one or more distances for a localization of the one or more trackers Ty, one or more other positional relationships may be determined, e.g. angles, for example.

According to various aspects, one or more of the sensors S1, S2, S3, S4 of the localization system may be assigned to a GPS device to allow for a determination of a position in GPS coordinates (e.g. in the global coordinate system Ref$_{global}$) for each of the sensors S1, S2, S3, S4. Therefore, one or more restraints on static UWB sensors are removed.

According to various aspects, the at least one additional sensor S4* may not be statically mounted, but may be positioned via a corresponding carrier drone. This carrier drone may not necessarily require GPS, but may be positioned on a predefined side (above or below) the basic plane. By this, a system setup may be installed faster, as no manlift or similar may be required. Only the one or more carrier drone(s) carrying the one or more additional sensors S4* may become airborne (e.g. some seconds) prior to other drones to be localized (e.g. prior to those drones with the trackers mounted).

According to various aspects, the three initial sensors S1, S2, S3 or all sensors S1, S2, S3, S4* may be mounted on a GPS equipped carrier drone. By this, the whole UWB basic plane 1311 may be located anywhere in space and moved any time.

Figure 14A:
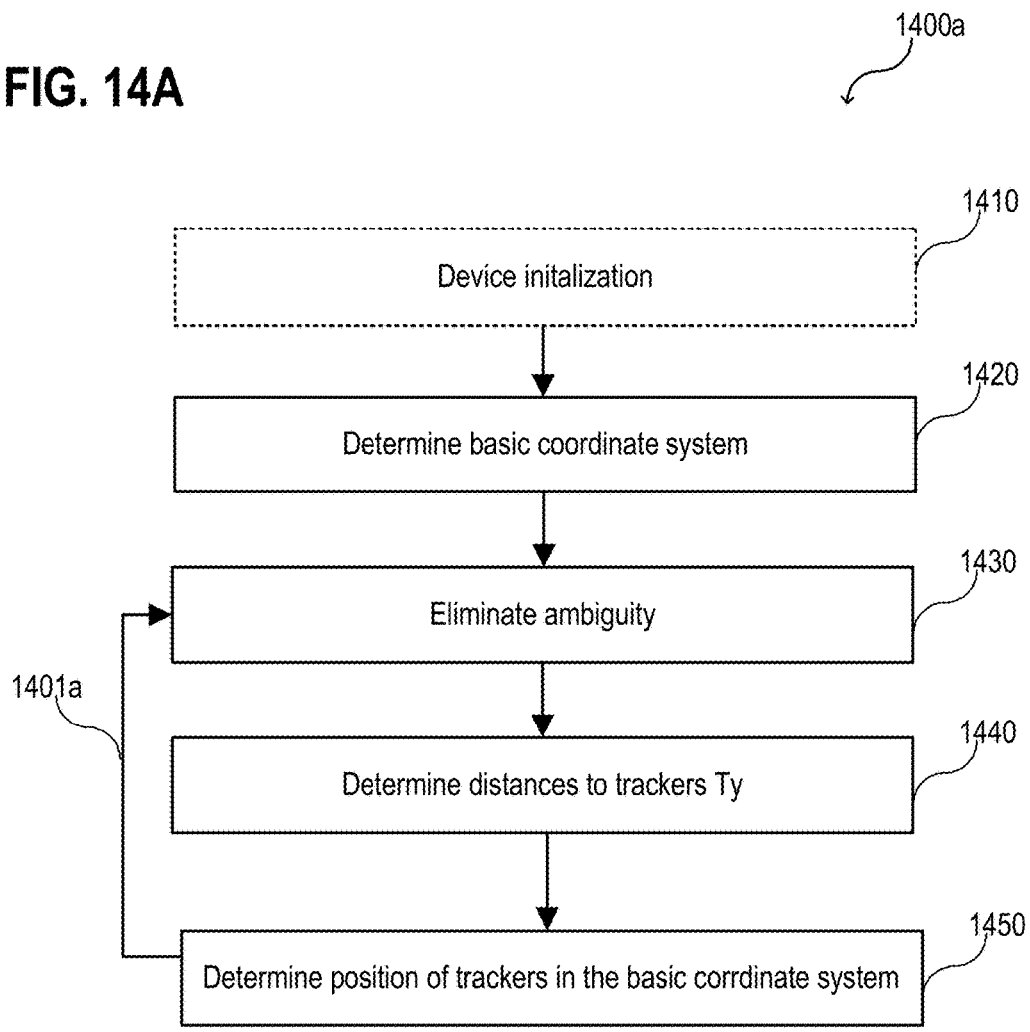
FIG. 14A and FIG. 14B show various aspects of a method for localizing one or more trackers in a schematic flow diagram, according to various aspects.
Figure 14B:
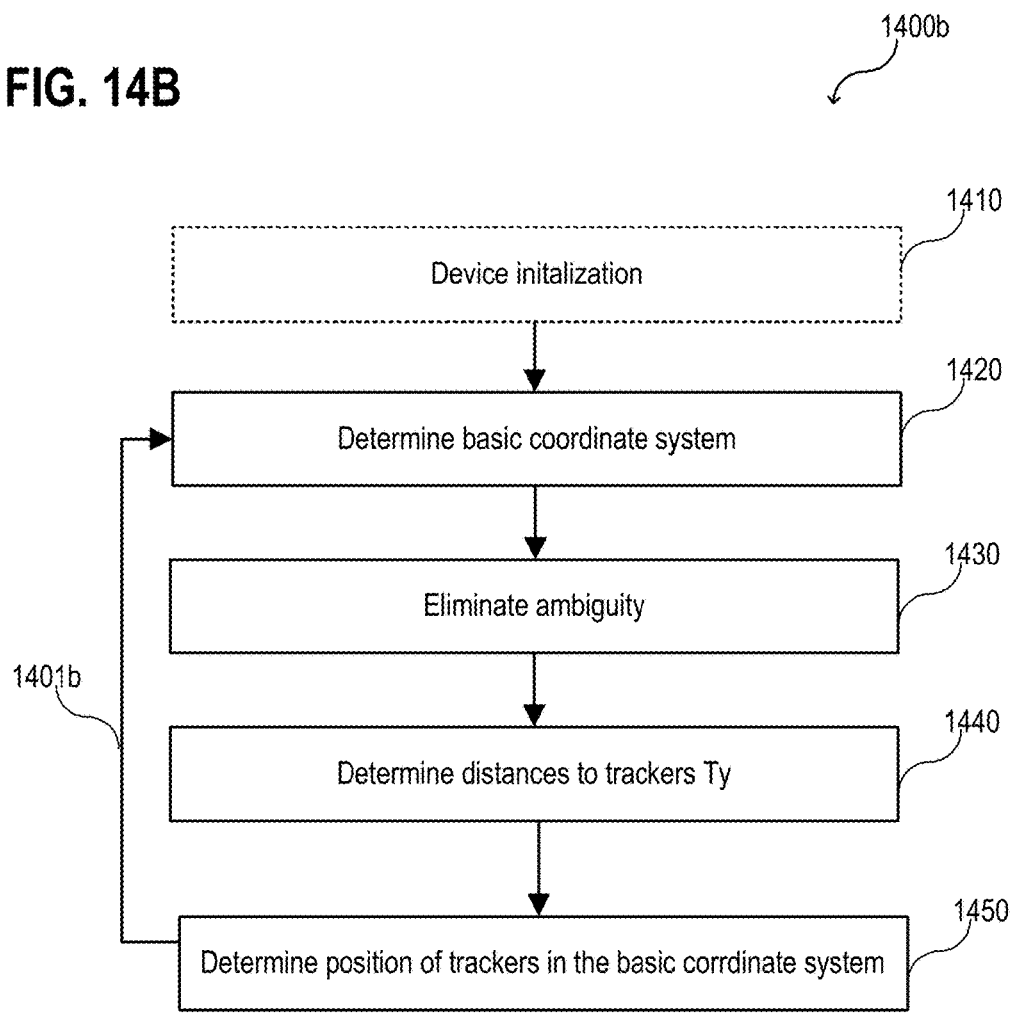

FIG. 14A and FIG. 14B respectively show a schematic flow diagram of a method 1400*a*, 1400*b* for localizing one or more trackers Ty, according to various aspects. The method may be carried out by a localization system.

According to various aspects, the methods 1400*a*, 1400*b* for localizing one or more trackers Ty may optionally include, e.g. in 1410, a device initialization. The device initialization may include positioning and activating the three initial sensors S1, S2, S3 and the at least one additional sensor S4*. The positioning of the respective sensor S1, S2, S3, S4* may include control flight of a carrier drone carrying the sensor S1, S2, S3, S4*. The flight of the carrier drone may be controlled based on GPS, i.e. the positioning of the respective sensor S1, S2, S3, S4* may be carried out based on GPS. In some aspects, an altitude (e.g. height over ground) of the respective carrier drone may be determined. This may, for example, allow for a determination whether the at least one additional sensor S4* is located above or below a plane defined by the three initial sensors s1, S2, S3.

According to various aspects, the methods 1400*a*, 1400*b* for localizing one or more trackers Ty may include, e.g. in 1420, determine a basic coordinate system (also referred to as local coordinate system Ref$_{loc}$). The determination of the basic coordinate system may be carried out, for example, as described herein with respect to the FIGS. 13A to 13C.

According to various aspects, the methods 1400*a*, 1400*b* for localizing one or more trackers Ty may include, e.g. in 1430, eliminate an ambiguity due to a localization via the three initial sensors S1, S2, S3. As an example, for a three dimensional distance based localization, at least four reference positions (defined by the three initial sensors S1, S2, S3 and the at least one additional sensor S4*) may be used. The ambiguity may be eliminated, for example, as described herein with respect to the FIGS. 13A to 13D.

According to various aspects, the methods 1400*a*, 1400*b* for localizing one or more trackers Ty may include, e.g. in 1440, determine distances between the one or more trackers Ty and the respective sensors S1, S2, S3, S4*. The distances may be determined, for example, based on any suitable type of position information, e.g. as described above.

According to various aspects, the methods 1400*a*, 1400*b* for localizing one or more trackers Ty may include, e.g. in 1450, determine a position of each of the one or more trackers Ty relative to the basic coordinate system. The distances may be determined, for example, based on determined distances or any other suitable position information, e.g. as described above.

According to various aspects, a current position (e.g. in the global coordinate system Ref$_{global}$) of the at least one additional sensor S4* may change during the localization, e.g. the corresponding carrier drone may move. Therefore, a closed loop sequence 1401a may be performed including, e.g. in method 1400a, the elimination of the ambiguity (in 1430), the determination of the distances to the trackers (in 1440), and the determination of the positions of the trackers in the basic coordinate system (1450).

According to various aspects, a current position (e.g. in the global coordinate system $Ref_{global}$) of the at least three initial sensors S1, S2, S3 (and optionally of the at least one additional sensor S4* as well) may change during the localization, e.g. the corresponding carrier drones may move. According to another aspect, a closed loop sequence 1401b may be performed including, e.g. in method 1400b, the determination of the basic coordinate system (1420), the elimination of the ambiguity (in 1430), the determination of the distances to the trackers (in 1440), and the determination of the positions of the trackers in the basic coordinate system (1450).

In the following, various examples are described that may refer to one or more aspects described above, e.g. to one or more aspects of the depth imaging system and/or the collision avoidance system described with reference to FIGS. 1 to 14B.

Example 1 is a vehicle control system, including: a set of localization devices including at least three reference localization devices and at least one additional localization device, wherein the at least three reference localization devices are configured to provide position information representing a positional relationship of the at least one additional localization device relative to the at least three reference localization devices, and wherein one or more localization devices of the set of localization devices are further configured to provide vehicle position information representing a positional relationship of one or more vehicles relative to the one or more localization devices of the set of localization devices. The vehicle control system may further include one or more processors configured to determine a reference coordinate system based on reference position information representing a positional relationship of the at least three reference localization devices relative to one another, determine a current position of each of the one or more vehicles within the reference coordinate system based on the vehicle position information provided by the one or more localization devices of the set of localization devices, receive a target position for each of the one or more vehicles within the reference coordinate system, and control movement of the one or more vehicles from the respective current position to the respective target position.

In example 2, the vehicle control system of example 1 may optionally further include that the at least three reference localization devices include a first reference localization device, a second reference localization device, and a third reference localization device. Further, the reference position information may represent a first positional relationship of the second reference localization device relative to the first reference localization device and a second positional relationship of the third reference localization device relative to the first reference localization device.

In example 3, the vehicle control system of example 2, may optionally further include that a position of the first reference localization device defines an origin of the reference coordinate system. Further, the first positional relationship may define a first axis of the reference coordinate system. Further, the second positional relationship may define a second axis of the reference coordinate system. Further, the first axis and the second axis may define a third axis of the reference coordinate system.

In example 4, the vehicle control system of any one of examples 1 to 3 may optionally further include that each of the localization devices of the set of localization devices includes an ultra-wideband localization device. Further, each of the one or more vehicles (to be controlled by the vehicle control system) may include an ultra-wideband localization device. The ultra-wideband localization device may be an ultra-wideband localization tracker and/or an ultra-wideband localization access point. An ultra-wideband localization device may include both functionalities and may serve as both a tracker and an access point.

In example 5, the vehicle control system of any one of examples 1 to 4 may optionally further include that each of the one or more vehicles (to be controlled by the vehicle control system) includes an ultra-wideband tracker. Further, each of the localization devices of the set of localization devices may include or may be an ultra-wideband localization access point.

In example 6, the vehicle control system of example 4 or 5 may optionally further include that the ultra-wideband localization device is configured to send and/or receive one or more signals with a signal bandwidth exceeding 500 MHz or 20% of a corresponding arithmetic center frequency.

In example 7, the vehicle control system of any one of examples 4 to 6 may optionally further include that the ultra-wideband localization device is configured to send and/or receive one or more signals in a frequency range from about 3.1 GHz to about 10.6 GHz.

In example 8, the vehicle control system of any one of examples 1 to 7 may optionally further include that the one or more processors are further configured to receive a position of at least one localization device of the at least three reference localization devices within a geographic coordinate system.

In example 9, the vehicle control system of any one of examples 1 to 8 may optionally further include that the one or more processors are further configured to receive data representing current global positioning system (GPS) coordinates of at least one localization device of the at least three reference localization devices, receive data representing target global positioning system (GPS) coordinates for the at least one reference localization device, and control movement of the at least one reference localization device from the current global positioning system (GPS) coordinates to the target global positioning system (GPS) coordinates.

In example 10, the vehicle control system of any one of examples 1 to 9 may optionally further include that the at least three reference localization devices are configured to provide the reference position information at predefined times. As an example, a localization of the one or more vehicles may be carried out in real-time.

In example 11, the vehicle control system of any one of examples 1 to 10 may optionally further include that the at least three reference localization devices are configured to provide the reference position information with a repetition rate of more than 1 Hz.

In example 12, the vehicle control system of any one of examples 1 to 11 may optionally further include that the determination of the reference coordinate system is carried out at predefined times.

In example 13, the vehicle control system of any one of examples 1 to 12 may optionally further include that the determination of the reference coordinate system is carried out with a repetition rate of more than 1 Hz.

In example 14, the vehicle control system of any one of examples 1 to 13 may optionally further include that the determination of the current position of each of the one or more vehicles (to be controlled by the vehicle control system) is carried out at predefined times.

In example 15, the vehicle control system of any one of examples 1 to 14 may optionally further include that the determination of the current position of each of the one or more vehicles (to be controlled by the vehicle control system) is carried out with a repetition rate of more than 1 Hz.

In example 16, the vehicle control system of any one of examples 1 to 15 may optionally further include one or more unmanned aerial vehicles configured to carry one or more localization devices of the set of localization devices.

In example 17, the vehicle control system of any one of examples 1 to 16 may optionally further include one or more unmanned aerial vehicles configured to carry one or more reference localization devices of the at least three reference localization devices.

In example 18, the vehicle control system of any one of examples 1 to 17 may optionally further include at least one unmanned aerial vehicle configured to carry the at least one additional localization device.

In example 19, the vehicle control system of any one of examples 1 to 18 may optionally further include one or more ground vehicles configured to carry one or more localization devices of the set of localization devices.

In example 20, the vehicle control system of any one of examples 1 to 19 may optionally further include one or more ground vehicles configured to carry one or more reference localization devices of the at least three reference localization devices.

In example 21, the vehicle control system of any one of examples 1 to 20 may optionally further include that the one or more vehicles (to be controlled by the vehicle control system) include one or more unmanned aerial vehicles.

In example 22, the vehicle control system of any one of examples 1 to 21 may optionally further include one or more further localization devices assigned to one or more reference localization devices of the at least three reference localization devices. The one or more further localization devices may be configured to provide further reference position information representing a position of the one or more reference localization devices of the at least three reference localization devices.

In example 23, the vehicle control system of any one of examples 1 to 22 may optionally further include that the one or more further localization devices are configured to operate at a greater maximal localization range than the at least three reference localization devices.

In example 24, the vehicle control system of any one of examples 1 to 23 may optionally further include that each of the one or more further localization devices includes a global positioning system (GPS) tracker configured to provide global positioning system (GPS) coordinates of the one or more further localization devices.

Example 25 is a vehicle control system, including a plurality of reference localization devices; and one or more processors configured to determine a positional relationship of the plurality of reference localization devices relative to one another, determine a reference coordinate system based on the determined positional relationship, determine a current position for each of one or more vehicles within the reference coordinate system, receive data representing a target position for each of the one or more vehicles within the reference coordinate system, and control movement of each of the one or more vehicles from the respective current position to the respective target position.

In example 26, the vehicle control system of example 25 may optionally further include that the plurality of reference localization devices includes a first reference localization device, a second reference localization device, and a third reference localization device.

In example 27, the vehicle control system of example 26 may optionally further include that the positional relationship represents a first direction from the first reference localization device to the second reference localization device and a second direction from the first reference localization device to the third reference localization device.

In example 28, the vehicle control system of example 27 may optionally further include that a first position of the first reference localization device defines an origin of the reference coordinate system. Further, the first direction may define a first axis of the reference coordinate system. Further, the second direction may define a second axis of the reference coordinate system. Further, the first axis and the second axis may define a third axis of the reference coordinate system.

In example 29, the vehicle control system of any one of examples 25 to 28 may optionally further include that each reference localization device of the plurality of reference localization devices includes an ultra-wideband localization device.

In example 30, the vehicle control system of example 29 may optionally further include that the ultra-wideband localization device is an ultra-wideband sensor.

In example 31, the vehicle control system of any one of examples 25 to 30 may optionally further include that each of the one or more vehicles (to be controlled by the vehicle control system) includes an ultra-wideband localization device. The ultra-wideband localization device of each of the one or more vehicles may be an ultra-wideband tracker.

In example 32, the vehicle control system of any one of examples 29 to 31 may optionally further include that the ultra-wideband localization device is configured to send and/or receive one or more signals with a signal bandwidth exceeding 500 MHz or 20% of a corresponding arithmetic center frequency.

In example 33, the vehicle control system of any one of examples 29 to 32 may optionally further include that the ultra-wideband localization device is configured to send and/or receive one or more signals in a frequency range from about 3.1 GHz to about 10.6 GHz.

In example 34, the vehicle control system of any one of examples 25 to 33 may optionally further include that the one or more processors are further configured to receive position data representing a position of one or more reference localization devices of the plurality of reference localization devices within a geographic coordinate system.

In example 35, the vehicle control system of any one of examples 25 to 34 may optionally further include that the one or more processors are further configured to receive data representing current global positioning system coordinates of one or more reference localization devices of the plurality of reference localization devices. The one or more processors may be further configured to receive data representing target global positioning system coordinates for the one or more reference localization devices of the plurality of reference localization devices. The one or more processors may be further configured to control movement of the one or more reference localization devices from the current global positioning system coordinates to the target global positioning system coordinates.

In example 36, the vehicle control system of any one of examples 25 to 35 may optionally further include that one or more reference localization devices of the plurality of reference localization devices are configured to provide reference position information representing the positional relationship at predefined times. The determination of the positional relationship may be based on the provided reference position information.

In example 37, the vehicle control system of example 36 may optionally further include that the reference position information are provided with a repetition rate of greater than 1 Hz.

In example 38, the vehicle control system of any one of examples 25 to 37 may optionally further include that the one or more processors are configured to determine the reference coordinate system at predefined times.

In example 39, the vehicle control system of any one of examples 25 to 38 may optionally further include that the one or more processors are configured to determine the reference coordinate system with a repetition rate of more than 1 Hz.

In example 40, the vehicle control system of any one of examples 25 to 39 may optionally further include that the one or more processors are configured to determine the current position of each of the one or more vehicles at predefined times.

In example 41, the vehicle control system of any one of examples 25 to 40 may optionally further include that the one or more processors are configured to determine the current position of each of the one or more vehicles with a repetition rate of more than 1 Hz.

In example 42, the vehicle control system of any one of examples 25 to 41 may optionally further include one or more unmanned aerial vehicles configured to carry one or more reference localization devices of the plurality of reference localization devices.

In example 43, the vehicle control system of any one of examples 25 to 42 may optionally further include an unmanned aerial vehicle for each of the plurality of reference localization devices, wherein the unmanned aerial vehicle is configured to carry the respective reference localization device of the plurality of reference localization devices.

In example 44, the vehicle control system of any one of examples 25 to 43 may optionally further include one or more additional localization devices, wherein the one or more processors are further configured to determine a position of each additional localization device of the one or more additional localization devices within the reference coordinate system. The one or more processors may be further configured to determine the respective position of each additional localization device of the one or more additional localization devices via one or more reference localization devices of the plurality of reference localization devices.

In example 45, the vehicle control system of example 44 may optionally further include that the one or more additional localization devices are configured to provide vehicle position information representing a positional relationship of the one or more vehicles relative to the one or more additional localization devices. The determination of the current position of each of the one or more vehicles may be based on the provided vehicle position information.

In example 46, the vehicle control system of example 44 or 45 may optionally further include one or more unmanned aerial vehicles configured to carry the one or more additional localization devices.

In example 47, the vehicle control system of any one of examples 25 to 46 may optionally further include that one or more reference localization devices of the plurality of reference localization devices are configured to provide vehicle position information representing a positional relationship of the one or more vehicles relative to the one or more reference localization devices. The determination of the current position of each of the one or more vehicles may be based on the provided vehicle position information.

In example 48, the vehicle control system of any one of examples 25 to 47 may optionally further include one or more ground vehicles configured to carry one or more reference localization devices of the plurality of reference localization devices.

In example 49, the vehicle control system of any one of examples 25 to 48 may optionally further include that the one or more vehicles (to be controlled by the vehicle control system) include one or more unmanned aerial vehicles.

In example 50, the vehicle control system of any one of examples 25 to 49 may optionally further include one or more further localization devices assigned to one or more reference localization devices of the plurality of reference localization devices. The one or more further localization devices may be configured to provide reference position information representing a position of the one or more reference localization devices of the plurality of reference localization devices. The determination of the positional relationship of the plurality of reference localization devices may be based on the provided reference position information.

In example 51, the vehicle control system of example 50 may optionally further include that the one or more further localization devices are configured to operate at a greater maximal localization range than the reference localization devices of the plurality of reference localization devices.

In example 52, the vehicle control system of example 50 or 51 may optionally further include that each of the one or more further localization devices includes a global positioning system (GPS) tracker configured to provide global positioning system (GPS) coordinates of the one or more further localization devices.

Example 53 is a vehicle control system, including: a plurality of localization devices configured to receive vehicle position information representing a position of one or more vehicles located in a vicinity of the plurality of localization devices, the plurality of localization devices includes a first set of localization devices and a second set of localization devices, wherein the first set of localization devices is configured to receive additional position information representing a position of one or more localization devices of the second set of localization devices; and one or more processors configured to receive reference position information representing a positional relationship of the localization devices of the first set of localization devices relative to one another; determine a current position of each of the one or more vehicles based on the vehicle position information, the reference position information, and the additional position information, receive target position information representing a target position for each of the one or more vehicles, and control movement of the one or more vehicles from the respective current position to the respective target position. As example, the first set of localization devices may include a first reference localization device, a second reference localization device, and a third reference localization device, and the reference position information may represent a first positional relationship of the second reference localization device relative to the first reference localization device and a second positional relationship of the third reference localization device relative to the first reference localization device. The localization devices of the first set (e.g. the three reference localization devices) may be configured, for example, as described in examples 1 to 23 with reference to the at least three reference localization devices.

Example 61 is a localization system, including: a plurality of localization devices configured to receive position information of one or more objects (e.g. one or more objects to be localized by the localization system) within a vicinity of the plurality of localization devices, the plurality of localization devices includes a first set of localization devices and a second set of localization devices; one or more processors configured to receive reference position information representing a position of each localization device of the first set of localization devices; determine additional position information representing a position of each localization device of the second set of localization devices via the first set of localization devices, and determine a position of each of the one or more objects based on the position information received by the plurality of localization devices and based on the reference position information and additional position information.

In example 62, the localization system of example 61 may optionally further include that the one or more processors are further configured to determine a reference coordinate system based on the received reference position information.

In example 63, the localization system of example 61 or 62 may optionally further include that the first set of localization devices includes a first localization device at a first position, a second localization device at a second position, and a third localization device at a third position.

In example 64, the localization system of example 62 and 63 may optionally further include that the first position defines an origin of the reference coordinate system. The first position and the second position may define a first axis of the reference coordinate system. The first position and the third position may define a second axis of the reference coordinate system. The first axis and the second axis may define a third axis of the reference coordinate system.

In example 65, the localization system of any one of examples 61 to 64 may optionally further include that the one or more processors are configured to determine the position of each of the one or more objects (to be localized by the localization system) within the reference coordinate system.

In example 66, the localization system of any one of examples 61 to 65 may optionally further include that each of the localization devices of the first set of localization devices and the second set of localization devices includes an ultra-wideband localization device and wherein each of the one or more objects (to be localized by the localization system) includes an ultra-wideband localization device.

In example 67, the localization system of any one of examples 61 to 66 may optionally further include that each of the localization devices of the first set of localization devices and the second set of localization devices includes an ultra-wideband localization access point. Further, each of the one or more objects (to be localized by the localization system) may include an ultra-wideband tracker.

In example 68, the localization system of example 66 or 67 may optionally further include that each ultra-wideband localization device of the first set of localization devices and the second set of localization devices is configured to send and/or receive one or more signals with a signal bandwidth exceeding 500 MHz or 20% of a corresponding arithmetic center frequency.

In example 69, the localization system of any one of examples 66 to 68 may optionally further include that each ultra-wideband localization device of the first set of localization devices and the second set of localization devices is configured to send and/or receive one or more signals in a frequency range from about 3.1 GHz to about 10.6 GHz.

In example 70, the localization system of any one of examples 61 to 69 may optionally further include that the determination of the additional position information is carried out at predefined times.

In example 71, the localization system of any one of examples 61 to 70 may optionally further include that the determination of the additional position information is carried out with a repetition rate of more than 1 Hz.

In example 72, the localization system of any one of examples 61 to 71 may optionally further include that the determination of the position of each of the one or more objects (to be localized by the localization system) is carried out at predefined times.

In example 73, the localization system of any one of examples 61 to 72 may optionally further include that the determination of the position information is carried out with a repetition rate of more than 1 Hz.

In example 74, the localization system of any one of examples 61 to 73 may optionally further include one or more unmanned aerial vehicles configured to carry one or more localization devices of the second set of localization devices.

In example 75, the localization system of any one of examples 61 to 74 may optionally further include one or more unmanned aerial vehicles configured to carry one or more localization devices of the first set of localization devices.

In example 76, the localization system of any one of examples 61 to 75 may optionally further include one or more ground robots configured to carry one or more localization devices of the first set of localization devices.

In example 77, the localization system of any one of examples 61 to 76 may optionally further include that the one or more objects (to be localized by the localization system) include one or more unmanned aerial vehicles.

In example 78, the localization system of example 77 may optionally further include that the one or more processors are further configured to control flight of the one or more unmanned aerial vehicles based on a predefined flight plan. The predefined flight plan may include one or more flight trajectories for each of the one or more unmanned aerial vehicles relative to the reference coordinate system of example 62.

In example 79, the localization system of any one of examples 61 to 78 may optionally further include that one or more further localization devices assigned to one or more localization devices of the first set of localization devices to determine at least a part of the reference position information.

In example 80, the localization system of example 79 may optionally further include that the one or more further localization devices are configured to operate at a greater maximal localization range than the plurality of localization devices.

In example 81, the localization system of example 79 or 80 may optionally further include that each of the one or more further localization devices includes a global positioning system (GPS) tracker.

33

In example 82, the localization system of any one of examples 61 to 81 may optionally further include that the one or more localization device of the first set of localization devices are configured to determine the position of one or more localization device of the first set of localization devices to generate at least a part of the reference position information.

Example 83 is a vehicle control system, including: a set of reference vehicles including at least three reference vehicles, each of the at least three reference vehicles including a localization device, wherein the localization devices of the at least three reference vehicles are configured to provide reference position information representing a positional relationship of the localization devices of the at least three reference vehicles relative to one another and to provide vehicle position information representing a positional relationship of one or more vehicles relative to the localization devices of the at least three reference vehicles; one or more processors configured to determine a reference coordinate system based on the reference position information provided by the localization devices of the at least three reference vehicles, determine a current position of the one or more vehicles within the reference coordinate system based on the vehicle position information provided by the localization devices of the at least three reference vehicles, receive a target position for each of the one or more vehicles within the reference coordinate system, and control movement of the one or more vehicles from the current position to the respective target position.

Example 84 is a method for controlling one or more vehicles, the method including: determining reference position information representing a positional relationship of at least three reference localization devices of a set of localization devices relative to one another, determining reference position information representing a positional relationship of a at least one additional localization device of the set of localization devices relative to the at least three reference localization devices, determining vehicle position information representing a positional relationship of one or more vehicles relative to the set of localization devices; determining a reference coordinate system based on the reference position information provided by the at least three reference localization devices; determining a current position of each of the one or more vehicles within the reference coordinate system based on the vehicle position information; receiving a target position for each of the one or more vehicles within the reference coordinate system; and controlling movement of the one or more vehicles from the respective current position to the respective target position.

In example 85, the determination of the reference position information of example 84 may include one or more aspects of examples 2 to 7.

In example 86, the method of example 84 or 85 may optionally further include receiving a position of at least one localization device of the at least three reference localization devices within a geographic coordinate system.

In example 87, the method of any one of examples 84 to 86 may optionally further include: receiving current global positioning system (GPS) coordinates of at least one localization device of the at least three reference localization devices; receiving target global positioning system (GPS) coordinates for the at least one reference localization device; and controlling movement of the at least one reference localization device from the current global positioning system (GPS) coordinates to the target global positioning system (GPS) coordinates.

34

In example 88, the method of any one of examples 84 to 87 may optionally further include that the reference position information are determined at predefined times by the at least three reference localization devices.

In example 89, the method of any one of examples 84 to 88 may optionally further include that the reference position information are determined with a repetition rate of more than 1 Hz.

In example 90, the method of any one of examples 84 to 89 may optionally further include that the reference coordinate system is determined at predefined times.

In example 91, the method of any one of examples 84 to 91 may optionally further include that the reference coordinate system is determined with a repetition rate of more than 1 Hz.

In example 92, the method of any one of examples 84 to 91 may optionally further include that the current position of each of the one or more vehicles (to be controlled by the vehicle control system) is determined at predefined times.

In example 93, the method of any one of examples 84 to 92 may optionally further include that the current position of each of the one or more vehicles (to be controlled by the vehicle control system) is determined with a repetition rate of more than 1 Hz.

In example 94, the method of any one of examples 84 to 93 may optionally further include control flight of one or more unmanned aerial vehicles, the one or more unmanned aerial vehicles carrying one or more localization devices of the set of localization devices.

In example 95, the method of any one of examples 84 to 94 may optionally further include control flight of one or more unmanned aerial vehicles, the one or more unmanned aerial vehicles carrying one or more localization devices of the at least three reference localization devices.

In example 96, the method of any one of examples 84 to 95 may optionally further include control flight of at least one unmanned aerial vehicle, the at least one unmanned aerial vehicle carrying the at least one additional localization device.

In example 97, the method of any one of examples 84 to 96 may optionally further include that control movement of one or more ground vehicles, the one or more ground vehicles carrying one or more localization devices of the set of localization devices.

In example 98, the method of any one of examples 84 to 97 may optionally further include control movement of one or more ground vehicles, the one or more ground vehicles carrying one or more localization devices of the at least three reference localization devices.

In example 99, the method of any one of examples 84 to 98 may optionally further include that the one or more vehicles (to be controlled by the vehicle control system) include one or more unmanned aerial vehicles.

In example 100, the method of any one of examples 84 to 99 may optionally further include determining further reference position information representing a position of one or more reference localization devices of the at least three reference localization devices by one or more further localization devices. The one or more further localization devices may be operated at a greater maximal localization range than the at least three reference localization devices. Each of the one or more further localization devices may include a GPS tracker to provide GPS coordinates of the one or more further localization devices.

Example 101 is a method for controlling one or more vehicles, the method including: determining reference position information representing a positional relationship of a at least three reference localization devices of a set of localization devices relative to one another; determining vehicle position information representing a positional relationship of one or more vehicles relative to one or more localization devices of the set localization devices; determining a reference coordinate system based on the reference position information provided by the at least three reference localization devices; determining a current position of each of the one or more vehicles within the reference coordinate system based on the vehicle position information provided by the one or more localization devices of the set of localization devices; receiving a target position for each of the one or more vehicles within the reference coordinate system; and controlling movement of the one or more vehicles from the respective current position to the respective target position.

In example 102, the method of example 101 may optionally further include that the at least three reference localization devices include a first reference localization device, a second reference localization device, and a third reference localization device, and wherein the reference position information represent a first positional relationship of the second reference localization device relative to the first reference localization device and a second positional relationship of the third reference localization device relative to the first reference localization device.

In example 103, the method of example 102 may optionally further include that a position of the first reference localization device defines an origin of the reference coordinate system, the first positional relationship defines a first axis of the reference coordinate system, the second positional relationship defines a second axis of the reference coordinate system, and wherein the first axis and the second axis define a third axis of the reference coordinate system.

In example 104, the method of any one of examples 101 to 103 may optionally further include that each of the localization devices of the set of localization devices includes an ultra-wideband localization device and wherein each of the one or more vehicles (to be controlled) includes an ultra-wideband localization device.

In example 105, the method of any one of examples 101 to 104 may optionally further include that each of the one or more vehicles (to be controlled) includes an ultra-wideband tracker.

In example 106, the method of example 104 or 105 may optionally further include that the ultra-wideband localization device is configured to send and/or receive one or more signals with a signal bandwidth exceeding 500 MHz or 20% of a corresponding arithmetic center frequency.

In example 107, the method of any one of examples 104 to 106 may optionally further include that the ultra-wideband localization device is configured to send and/or receive one or more signals in a frequency range from about 3.1 GHz to about 10.6 GHz.

In example 108, the method of any one of examples 101 to 107 may optionally further include receiving a position of at least one localization device of the at least three reference localization devices within a geographic coordinate system.

In example 109, the method of any one of examples 101 to 108 may optionally further include: receiving current global positioning system (GPS) coordinates of at least one localization device of the at least three reference localization devices; receiving target global positioning system (GPS) coordinates for the at least one reference localization device; and controlling movement of the at least one reference localization device from the current global positioning system (GPS) coordinates to the target global positioning system (GPS) coordinates.

In example 110, the method of any one of examples 101 to 109 may optionally further include that the reference position information are determined at predefined times (e.g. by the at least three reference localization devices).

In example 111, the method of any one of examples 101 to 110 may optionally further include that the reference position information are determined with a repetition rate of more than 1 Hz.

In example 112, the method of any one of examples 101 to 111 may optionally further include that the reference coordinate system is determined at predefined times.

In example 113, the method of any one of examples 101 to 112 may optionally further include that the reference coordinate system is determined with a repetition rate of more than 1 Hz.

In example 114, the method of any one of examples 101 to 113 may optionally further include that the current position of each of the one or more vehicles (to be controlled) is determined at predefined times.

In example 115, the method of any one of examples 101 to 114 may optionally further include that the current position of each of the one or more vehicles (to be controlled) is determined with a repetition rate of more than 1 Hz.

In example 116, the method of any one of examples 101 to 115 may optionally further include control flight of one or more unmanned aerial vehicles, the one or more unmanned aerial vehicles carrying one or more localization devices of the set of localization devices.

In example 117, the method of any one of examples 101 to 116 may optionally further include control flight of one or more unmanned aerial vehicles, the one or more unmanned aerial vehicles carrying one or more localization devices of the at least three reference localization devices.

In example 118, the method of any one of examples 101 to 117 may optionally further include determining additional position information representing a positional relationship of at least one additional localization device of the set of localizations devices relative to the at least three reference localization devices.

In example 119, the method of any one of examples 101 to 118 may optionally further include determining additional vehicle position information representing an additional positional relationship of the one or more vehicles relative to the at least one additional localization device, wherein the determination of the current position of each of the one or more vehicles is based on the additional vehicle position information.

In example 120, the method of example 118 or 119 may optionally further include control flight of at least one unmanned aerial vehicle, the at least one unmanned aerial vehicle carrying the at least one additional localization device.

In example 121, the method of any one of examples 101 to 120 may optionally further include control movement of one or more ground vehicles, the one or more ground vehicles carrying one or more localization devices of the set of localization devices.

In example 122, the method of any one of examples 101 to 121 may optionally further include control movement of one or more ground vehicles, the one or more ground vehicles carrying one or more localization devices of the at least three reference localization devices.

In example 123, the method of any one of examples 101 to 122 may optionally further include that the one or more vehicles (to be controlled) include one or more unmanned aerial vehicles.

In example 124, the method of any one of examples 101 to 123 may optionally further include determining further reference position information representing a position of one or more reference localization devices of the at least three reference localization devices by one or more further localization devices.

In example 125, the method of any one of examples 101 to 125 may optionally further include that the one or more further localization devices are operated at a greater maximal localization range than the at least three reference localization devices.

In example 126, the method of any one of examples 101 to 125 may optionally further include that each of the one or more further localization devices includes a global positioning system (GPS) tracker to provide global positioning system (GPS) coordinates of the one or more further localization devices.

Example 127 is a method for localizing one or more vehicles, the method including: determining a reference position of each reference localization device of a plurality of reference localization devices, wherein one or more reference localization devices of the plurality of reference localization devices are mounted at an unmanned aerial vehicles, determining a reference coordinate system based on the determined reference positions, determining a current position of one or more vehicles in the reference coordinate system.

The method for localizing one or more vehicles of example 127 may include one or more aspects of the preceding examples.

In some aspects, any method described herein may be partially or completely implemented as a non-transitory computer readable medium with program instructions, which when executed, cause one or more processors to perform at least a portion or all of the method.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A vehicle localization system, comprising:
   a plurality of localization devices configured to receive vehicle position information representing a position of one or more vehicles located in a vicinity of the plurality of localization devices, the plurality of localization devices comprising a first set of localization devices and a second set of localization devices, wherein the first set of localization devices is configured to receive additional position information representing a position of one or more localization devices of the second set of localization devices; and
   one or more processors configured to
   receive reference position information representing a positional relationship of the localization devices of the first set of localization devices relative to one another, and
   determine a current position of each of the one or more vehicles based on the vehicle position information, the reference position information, and the additional position information;
   wherein the first set of localization devices comprises a first reference localization device, a second reference localization device, and a third reference localization device, and wherein the reference position information represent a first positional relationship of the second reference localization device relative to the first reference localization device and a second positional relationship of the third reference localization device relative to the first reference localization device;
   wherein the position of a first reference localization device defines an origin of a reference coordinate system, the first positional relationship defines a first axis of the reference coordinate system, the second positional relationship defines a second axis of the reference coordinate system, and wherein the first axis and the second axis define a third axis of the reference coordinate system.

2. The vehicle localization system of claim 1,
   wherein each of the plurality of localization devices comprises an ultra-wideband localization device and wherein each of the one or more vehicles comprises an ultra-wideband localization device.

3. The vehicle localization system of claim 1,
   wherein each of the plurality of localization devices comprises an ultra-wideband localization access point and wherein each of the one or more vehicles comprises an ultra-wideband localization tracker.

4. The vehicle localization system of claim 2,
   wherein the ultra-wideband localization device is configured to send and/or receive one or more signals with a signal bandwidth exceeding 500 MHz or 20% of a corresponding arithmetic center frequency; and
   wherein the ultra-wideband localization device is configured to send and/or receive one or more signals in a frequency range from 3.1 GHz to 10.6 GHz.

5. The vehicle localization system of claim 1,
   wherein the one or more processors are further configured to receive data representing a position of one or more localization device of the first set of localization devices within a geographic coordinate system.

6. The vehicle localization system of claim 5, further comprising:
   one or more ground vehicles and/or one or more unmanned aerial vehicles configured to carry one or more localization devices of the first set of localization devices.

7. The vehicle localization system of claim 1,
   wherein the one or more processors are further configured to
   receive data representing current global positioning system coordinates of one or more localization devices of the first set of localization devices,
   receive data representing target global positioning system coordinates for the one or more localization device of the first set of localization devices, and
   control movement of the one or more localization devices of the first set of localization devices from the current global positioning system coordinates to the target global positioning system coordinates.

8. The vehicle localization system of claim 1, further comprising:
   one or more further localization devices assigned to one or more localization devices of the first set of localization devices and configured to provide further reference position information representing a position of the one or more localization devices of the first set of localization devices, wherein the one or more further localization devices are configured to operate at a greater maximal localization range than the localization devices of the first set of localization devices.

9. The vehicle localization system of claim 8, wherein each of the one or more further localization devices comprises a GPS localization device configured to provide GPS coordinates of the one or more further localization devices.

10. The vehicle localization system of claim 1, wherein the localization devices of the first set of localization devices are configured to provide the reference position information.

11. The vehicle localization system of claim 1, further comprising:
a plurality of unmanned aerial vehicles, wherein each of the plurality of localization devices is mounted to one of the plurality unmanned aerial vehicles.

12. The vehicle localization system of claim 1, further comprising:
one or more unmanned aerial vehicles, wherein one or more localization devices of the second set of localization devices are mounted to the one or more unmanned aerial vehicles.

13. The vehicle localization system of claim 1, wherein the one or more vehicles comprise one or more unmanned aerial vehicles.

14. A vehicle control system, comprising:
a vehicle localization system of claim 1 to determine a current position of each of one or more vehicles; and
one or more processors configured to
the receive target position information representing a target position for each of the one or more vehicles, and
control movement of the one or more vehicles from the respective current position to the respective target position.

15. A method for localizing one or more vehicles, the method comprising:
controlling flight of a first and second set of unmanned aerial vehicles, each of the first and second set of unmanned aerial vehicles comprise a localization device;
determining, via the localization devices, reference position information representing a current positional relationship of the localization devices relative to another; and
determining, via the localization devices, a current position of the one or more vehicles relative to the localization devices based on the determined reference position information;
wherein the first set of localization devices is configured to receive position information representing a position of two or more localization devices of the second set of localization devices;
wherein the first set of localization devices comprises a first reference localization device, a second reference localization device, and a third reference localization device, and wherein the reference position information represent a first positional relationship of the second reference localization device relative to the first reference localization device and a second positional relationship of the third reference localization device relative to the first reference localization device;
wherein the position of a first reference localization device defines an origin of a reference coordinate system, the first positional relationship defines a first axis of the reference coordinate system, the second positional relationship defines a second axis of the reference coordinate system, and wherein the first axis and the second axis define a third axis of the reference coordinate system.

16. The method of claim 15,
wherein the reference position information is determined at predefined times, and
wherein the current position of each of the one or more objects is determined at predefined times.

17. A method for localizing one or more vehicles, the method comprising:
controlling flight of one or more of unmanned aerial vehicles, each of the one or more unmanned aerial vehicles comprise an additional localization device;
determining, via a first and second set of reference localization devices, a reference coordinate system and position information representing a current positional relationship of the one or more additional localization devices relative to the first and second set of reference localization devices; and
determining, via the reference localization devices and the additional localization devices, a current position of the one or more vehicles within the reference coordinate system;
wherein the first set of localization devices is configured to receive position information representing a position of two or more localization devices of the second set of localization devices;
wherein the first set of localization devices comprises a first reference localization device, a second reference localization device, and a third reference localization device, and wherein the reference position information represent a first positional relationship of the second reference localization device relative to the first reference localization device and a second positional relationship of the third reference localization device relative to the first reference localization device;
wherein the position of a first reference localization device defines an origin of a reference coordinate system, the first positional relationship defines a first axis of the reference coordinate system, the second positional relationship defines a second axis of the reference coordinate system, and wherein the first axis and the second axis define a third axis of the reference coordinate system.

18. The method of claim 17,
wherein the reference coordinate system and position information are determined at predefined times, and
wherein the current position of each of the one or more objects is determined at predefined times.

* * * * *